United States Patent
Huang et al.

(10) Patent No.: US 12,438,160 B2
(45) Date of Patent: Oct. 7, 2025

(54) ELECTROCHEMICAL CELL WITH IMPROVED HIGH-RATE DISCHARGE PERFORMANCE

(71) Applicant: ENERGIZER BRANDS, LLC, St. Louis, MO (US)

(72) Inventors: Weiwei Huang, Westlake, OH (US); Frank J. Kerosky, North Olmsted, OH (US)

(73) Assignee: Energizer Brands, LLC, St. Louis, MO (US)

( * ) Notice: Subject to any disclaimer, the term of this patent is extended or adjusted under 35 U.S.C. 154(b) by 395 days.

(21) Appl. No.: 18/062,820

(22) Filed: Dec. 7, 2022

(65) Prior Publication Data

US 2023/0107553 A1    Apr. 6, 2023

Related U.S. Application Data

(63) Continuation of application No. 16/454,991, filed on Jun. 27, 2019, now Pat. No. 11,552,304.

(51) Int. Cl.
*H01M 6/04* (2006.01)
*H01M 4/02* (2006.01)
(Continued)

(52) U.S. Cl.
CPC .............. *H01M 6/04* (2013.01); *H01M 4/06* (2013.01); *H01M 4/244* (2013.01); *H01M 4/661* (2013.01);
(Continued)

(58) Field of Classification Search
CPC .......... H01M 6/02; H01M 6/04; H01M 6/045; H01M 4/06; H01M 4/244; H01M 4/661;
(Continued)

(56) References Cited

U.S. PATENT DOCUMENTS

| 316,409 A | 4/1885 | Shaw |
| 678,512 A | 7/1901 | Perry |

(Continued)

FOREIGN PATENT DOCUMENTS

| DE | 431881 | 7/1926 |
| EP | 1093671 A1 | 4/2001 |

(Continued)

OTHER PUBLICATIONS

IPEA/409—International Preliminary Report on Patentability Mailed on Sep. 27, 2021 for WO Application No. PCT/US20/039662, 6 page(s).

(Continued)

*Primary Examiner* — Armindo Carvalho, Jr.

(74) *Attorney, Agent, or Firm* — Alston & Bird LLP

(57) ABSTRACT

An alkaline electrochemical cell has a central cathode having a corresponding cathode current collector electrically connected with a positive terminal of the electrochemical cell. The cathode current collector has a tubular shape, such as a cylindrical shape or rectangular shape, extending parallel with the length of the central cathode. The cathode current collector is embedded within the central cathode, such as at a medial point of a radius of the central cathode, thereby minimizing the distance between the cathode current collector and any portion of the central cathode, thereby increasing the mechanical strength of the cathode and facilitating charge transfer to the cathode current collector.

20 Claims, 11 Drawing Sheets

(51) Int. Cl.
*H01M 4/06* (2006.01)
*H01M 4/24* (2006.01)
*H01M 4/66* (2006.01)
*H01M 4/74* (2006.01)
*H01M 4/75* (2006.01)
*H01M 4/78* (2006.01)
*H01M 6/02* (2006.01)

(52) U.S. Cl.
CPC ........... *H01M 4/663* (2013.01); *H01M 4/667* (2013.01); *H01M 4/742* (2013.01); *H01M 4/75* (2013.01); *H01M 4/78* (2013.01); *H01M 6/02* (2013.01); *H01M 6/045* (2013.01); *H01M 2004/025* (2013.01); *H01M 2004/028* (2013.01); *H01M 2300/0014* (2013.01)

(58) Field of Classification Search
CPC ...... H01M 4/663; H01M 4/667; H01M 4/742; H01M 4/75; H01M 4/78
See application file for complete search history.

(56) References Cited

U.S. PATENT DOCUMENTS

| | | | |
|---|---|---|---|
| 1,626,173 A | 4/1927 | Yngve | |
| 1,641,524 A | 9/1927 | Birdsall | |
| 2,480,839 A | 9/1949 | Daniel | |
| 2,542,094 A | 2/1951 | Richardson et al. | |
| 2,542,574 A | 2/1951 | Ruben | |
| 2,542,576 A | 2/1951 | Ruben | |
| 2,960,558 A | 11/1960 | Marsal et al. | |
| 2,977,401 A | 3/1961 | Marsal et al. | |
| 2,980,747 A | 4/1961 | Daley | |
| 3,156,585 A | 11/1964 | Yamano et al. | |
| 3,196,051 A | 7/1965 | Balaguer | |
| 3,335,031 A | 8/1967 | Kordesch | |
| 3,350,235 A | 10/1967 | Balaguer | |
| 3,364,073 A | 1/1968 | Balaguer | |
| 3,490,951 A | 1/1970 | George | |
| 3,496,018 A | 2/1970 | Hamlen et al. | |
| 3,738,869 A | 6/1973 | Zaleski | |
| 3,787,243 A | 1/1974 | Zaleski | |
| 3,945,847 A | 3/1976 | Kordesch et al. | |
| 4,011,103 A | 3/1977 | Kordesch | |
| 4,016,339 A | 4/1977 | Gray et al. | |
| 4,032,695 A | 6/1977 | Coibion | |
| 4,042,756 A | 8/1977 | Goebel et al. | |
| 5,300,371 A | 4/1994 | Tomantschger et al. | |
| 5,472,806 A | 12/1995 | Meintjes | |
| 5,489,493 A | 2/1996 | Urry | |
| 5,518,836 A | 5/1996 | McCullough | |
| 5,639,578 A | 6/1997 | Urry | |
| 5,716,729 A | 2/1998 | Sunderland et al. | |
| 5,856,040 A | 1/1999 | Newman et al. | |
| 5,869,205 A | 2/1999 | Mick et al. | |
| 5,948,561 A | 9/1999 | Urry | |
| 6,074,781 A | 6/2000 | Jurca | |
| 6,081,992 A * | 7/2000 | Kelemen | H01M 50/171 29/623.1 |
| 6,150,052 A | 11/2000 | Urry | |
| 6,200,700 B1 | 3/2001 | Yano et al. | |
| 6,207,322 B1 | 3/2001 | Kelsey et al. | |
| 6,224,640 B1 | 5/2001 | Tucholski | |
| 6,261,717 B1 | 7/2001 | Luo et al. | |
| 6,326,102 B1 | 12/2001 | Getz | |
| 6,342,317 B1 | 1/2002 | Patel et al. | |
| 6,410,187 B1 | 6/2002 | Luo et al. | |
| 6,472,099 B1 | 10/2002 | Lee et al. | |
| 6,482,543 B1 | 11/2002 | Shelekhin et al. | |
| 6,592,635 B2 | 7/2003 | Getz | |
| 6,737,189 B1 | 5/2004 | Vandayburg et al. | |
| 6,805,995 B2 | 10/2004 | Yoshinaka et al. | |
| 6,869,727 B2 | 3/2005 | Slezak | |
| 7,264,903 B2 | 9/2007 | Coffey et al. | |
| 7,341,803 B2 | 3/2008 | Huang et al. | |
| 7,553,585 B2 | 6/2009 | Slezak | |
| 9,306,206 B2 | 4/2016 | Davis et al. | |
| 11,552,304 B2 | 1/2023 | Huang et al. | |
| 11,552,305 B2 | 1/2023 | Huang et al. | |
| 11,560,321 B2 | 1/2023 | Zheng | |
| 2001/0028976 A1 | 10/2001 | Treger et al. | |
| 2001/0053473 A1 | 12/2001 | Getz | |
| 2002/0106558 A1 | 8/2002 | Maske et al. | |
| 2002/0160262 A1 | 10/2002 | Urry et al. | |
| 2003/0162086 A1 | 8/2003 | Longhi, Jr. et al. | |
| 2004/0058235 A1 * | 3/2004 | Huang | H01M 6/06 429/211 |
| 2004/0258982 A1 | 12/2004 | Coffey et al. | |
| 2009/0253040 A1 | 10/2009 | Okada | |
| 2013/0189592 A1 * | 7/2013 | Roumi | H01M 8/0247 429/405 |
| 2013/0236756 A1 | 9/2013 | Wang et al. | |
| 2016/0006043 A1 | 1/2016 | Hucker et al. | |
| 2020/0381690 A1 | 12/2020 | Huang et al. | |
| 2020/0411878 A1 | 12/2020 | Huang et al. | |
| 2020/0411884 A1 | 12/2020 | Huang et al. | |
| 2023/0107553 A1 | 4/2023 | Huang et al. | |
| 2023/0108519 A1 | 4/2023 | Huang et al. | |

FOREIGN PATENT DOCUMENTS

| | | |
|---|---|---|
| FR | 2622359 | 4/1989 |
| GB | 1036156 A | 7/1966 |
| GB | 2231196 A | 11/1990 |
| JP | 22653-1970 B | 7/1970 |
| JP | S49-11504 U | 3/1974 |
| JP | S52-142237 A | 11/1977 |
| WO | 2000/003397 A1 | 6/2000 |
| WO | WO-2000/033397 A2 | 6/2000 |
| WO | 2001/008244 A1 | 2/2001 |
| WO | WO-2001/097298 A2 | 12/2001 |
| WO | WO-2001/097302 A2 | 12/2001 |
| WO | WO-2001/099214 A1 | 12/2001 |
| WO | WO-2013/133952 A1 | 9/2013 |

OTHER PUBLICATIONS

International Search Report and Written Opinion for International Application No. PCT/US2020/039662, dated Oct. 12, 2020, (11 pages), European Patent Office, Rijswijk, Netherlands.
NonFinal Office Action for U.S. Appl. No. 16/454,991, dated Jan. 26, 2021, (29 pages), United States Patent and Trademark Office, US.
Second Written Opinion for International Application No. PCT/US2020/039662, dated Jun. 1, 2021, (6 pages), European Patent Office, Munich, Germany.
Non-Final Rejection Mailed on Apr. 29, 2025 for U.S. Appl. No. 18/055,217, 15 page(s).
ISA/220—Notification of Transmittal or Search Report and Written Opinion of the ISA, or the Declaration Mailed on Jul. 9, 2025 for WO Application No. PCT/US25/010910, 17 page(s).

* cited by examiner

ELECTROCHEMICAL CELL WITH IMPROVED HIGH-RATE DISCHARGE PERFORMANCE

CROSS-REFERENCE TO RELATED APPLICATIONS

This patent application is a continuation of U.S. patent application Ser. No. 16/454,991, filed Jun. 27, 2019, which is incorporated herein by reference in its entirety.

BACKGROUND

Batteries in the form of electrochemical cells are used as power sources for a wide range of electronic devices. The requirements of those electronic devices are important factors in battery design. For example, many electronic devices have battery compartments that limit the size and/or shape of batteries to be contained therein. Thus, certain electrochemical cells, such as alkaline primary batteries, are commercially available in cell sizes commonly known as LR6 (AA), LR03 (AAA), LR14 (C) and LR20 (D). The cells have a cylindrical shape that must comply with the dimensional standards that are set by organizations such as the International Electrotechnical Commission. Moreover, the discharge characteristics of the batteries should be provided to accommodate the intended device operation under expected conditions of use.

Over time, many electronic devices have incorporated increasing numbers of features that require higher-power draws from onboard batteries to appropriately power the devices. The increased high-power demands of these electronic devices require batteries capable of delivering consistent high-rate discharge performance over an extended period of time. However, high-rate discharge of traditional battery chemistries, such as traditional alkaline batteries incorporating manganese dioxide cathode materials and zinc-based anode materials within an alkaline electrolyte solution, often results in decreases in discharge efficiency, with a battery often failing to deliver desired voltage outputs well before all of the active material within the battery is exhausted.

Accordingly, a need constantly exists for improvements in battery design to improve discharge performance under various discharge rate circumstances.

BRIEF SUMMARY

Certain embodiments are directed to an alkaline electrochemical cell having a centrally-located, cathode, surrounded by an anode, wherein the cathode is separated from the anode by a separator. The cathode has an associated tubular (e.g., cylindrical or rectangular) mesh current collector extending along at least a portion of the length of the cathode, and electrically connecting the cathode to a positive contact terminal.

Various embodiments are directed to an alkaline electrochemical cell comprising: a container; and an anode ring positioned within the container and defining an opening therein, wherein the anode ring comprises a zinc active material; an inner cathode positioned within the opening of the anode, wherein the inner cathode comprises a manganese oxide active material; a cathode current collector comprising a conducting tube positioned within the inner cathode, wherein the cathode current collector is electrically connected with a positive terminal of the electrochemical cell; and a separator positioned between the anode ring and the inner cathode.

In certain embodiments, the alkaline cell further comprises an outer cathode ring positioned between an outer surface of the anode ring and an interior surface of the container. In various embodiments, the cathode current collector is in electrical contact with the container via a conductive tab. In certain embodiments, the conducting tube comprises a conducting mesh material. Moreover, the conducting tube may comprise a nickel mesh material. In various embodiments, the nickel mesh material has a graphite coating. In certain embodiments, the conducting tube comprises a perforated nickel foil material. In various embodiments, the conducting tube comprises a conducting wire coil. Moreover, the cathode current collector may have a cross-sectional shape corresponding to the shape of the inner cathode. In certain embodiments, the inner cathode has a cylindrical shape, and a diameter of the cathode current collector is at least substantially half of a diameter of the inner cathode. In various embodiments, the cathode current collector is embedded within an exterior surface of the inner cathode. In certain embodiments, the inner cathode comprises a plurality of cylindrical cathode pellets stacked axially within the opening of the anode. Moreover, the cathode current collector may be embedded within an exterior surface of each of the plurality of cylindrical cathode pellets. In various embodiments, the anode ring comprises a gelled anode.

Various embodiments are directed to an alkaline electrochemical cell comprising: a container; an outer cathode ring positioned adjacent an interior surface of the container and defining an opening therein, wherein the outer cathode ring comprises a cathode active material; at least one anode portion positioned within the opening of the outer cathode, wherein the at least one anode comprises a zinc active material; an inner cathode positioned adjacent a side of the at least one anode portion; a cathode current collector comprising a conducting tube positioned within the inner cathode, wherein the cathode current collector is electrically connected with a positive terminal of the electrochemical cell; and a separator material: positioned between the outer cathode ring and the at least one anode portion; and positioned between the at least one anode portion and the inner cathode.

In various embodiments, the cathode current collector is in electrical contact with container via a conductive tab. In certain embodiments, the conducting tube comprises a conducting mesh material. In various embodiments, the inner cathode has an at least substantially rectangular cross-section. Moreover, the at least one anode portion comprises two anode portions, wherein the two anode portions are positioned on opposite sides of the inner cathode. In certain embodiments, the cathode current collector has a cross-sectional shape corresponding to the cross-sectional shape of the inner cathode. In various embodiments, the cathode current collector is embedded within an exterior surface of the inner cathode. In various embodiments, the cathode comprises: a cathode rod comprising a cathode active material; and a cathode current collector comprising a conducting tube embedded within the cathode rod. Moreover, the cathode rod may be a cylinder. The cathode rod may comprise a plurality of cathode pellets stacked axially relative to one another. In certain embodiments, the cathode current collector is wrapped around the plurality of cathode pellets and embedded within an outer surface of the plurality of cathode pellets. In various embodiments, the cathode current collector has a shape corresponding to the shape of the cathode rod. In certain embodiments, the cathode rod and the cathode current collector are at least substantially cylindrical and the cathode current collector is at least substantially concentric with the cathode rod, and wherein the cathode current collector has a diameter at least substantially half of a diameter of the cathode rod. Moreover, the cathode rod and the cathode current collector are at least substantially rectangular. In certain embodiments, the conducting tube comprises a conducting mesh or perforated material. Moreover, the conducting tube may comprise a nickel mesh material. In certain embodiments, the nickel mesh material has a graphite coating. In various embodiments, the conducting tube comprises a perforated nickel foil material. Moreover, the conducting tube may comprise a conducting wire coil.

Certain embodiments are directed to a method of manufacturing an electrochemical cell, the method comprising: placing an outer cathode ring within a container, wherein the outer cathode ring is in contact with an interior surface of the container and defines a cathode opening bounded by an inner surface of the outer cathode ring; covering the inner surface of the outer cathode ring with a separator material; disposing an anode material within the cathode opening, wherein the anode material is separated from the container and the outer cathode ring by the separator; positioning an inner cathode comprising an embedded cathode current collector and covered with a separator within the cathode opening of the outer cathode ring, thereby displacing at least a portion of the anode material into a gap defined between the inner surface of the outer cathode ring and an outer surface of the inner cathode; electrically connecting the cathode current collector with the container; extending an anode current collector into the anode material; and sealing the container with a cover, wherein the cover is in electrical connection with the anode current collector.

In various embodiments, electrically connecting the cathode current collector with the container comprises attaching a conducting tab between the cathode current collector and the container. Moreover, the method may further comprise electrically insulating the conducting tab from the anode and anode current collector. In certain embodiments, positioning an inner cathode within the cathode opening further comprises: forming a plurality of cathode pellets; stacking the plurality of cathode pellets axially; embedding the cathode current collector within an exterior surface of the plurality of cathode pellets to form the inner cathode; and wrapping the inner cathode with the separator material.

Certain embodiments are directed to a method of manufacturing an electrochemical cell, wherein the method may comprise: placing an outer cathode ring within a container, wherein the outer cathode ring is in contact with an interior surface of the container and defines a cathode opening bounded by an inner surface of the outer cathode ring; covering the inner surface of the outer cathode ring with a separator material; positioning an inner cathode comprising an embedded cathode current collector and covered with a separator within the cathode opening of the outer cathode ring such that an outer surface of the inner cathode is spaced apart from the inner surface of the outer cathode ring; disposing an anode material between the outer cathode and the inner cathode; electrically connecting the cathode current collector with the container; extending an anode current collector into the anode material; and sealing the container with a cover, wherein the cover is in electrical connection with the anode current collector.

In certain embodiments, electrically connecting the cathode current collector with the container comprises attaching a conducting plate between the cathode current collector and a closed bottom end of the container. In various embodiments, electrically insulating the conducting plate from the anode. Moreover, positioning an inner cathode within the cathode opening may further comprise: forming a plurality of cathode pellets; stacking the plurality of cathode pellets axially; embedding the cathode current collector within an exterior surface of the plurality of cathode pellets to form the inner cathode; and wrapping the inner cathode with the separator material.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Figure 1:
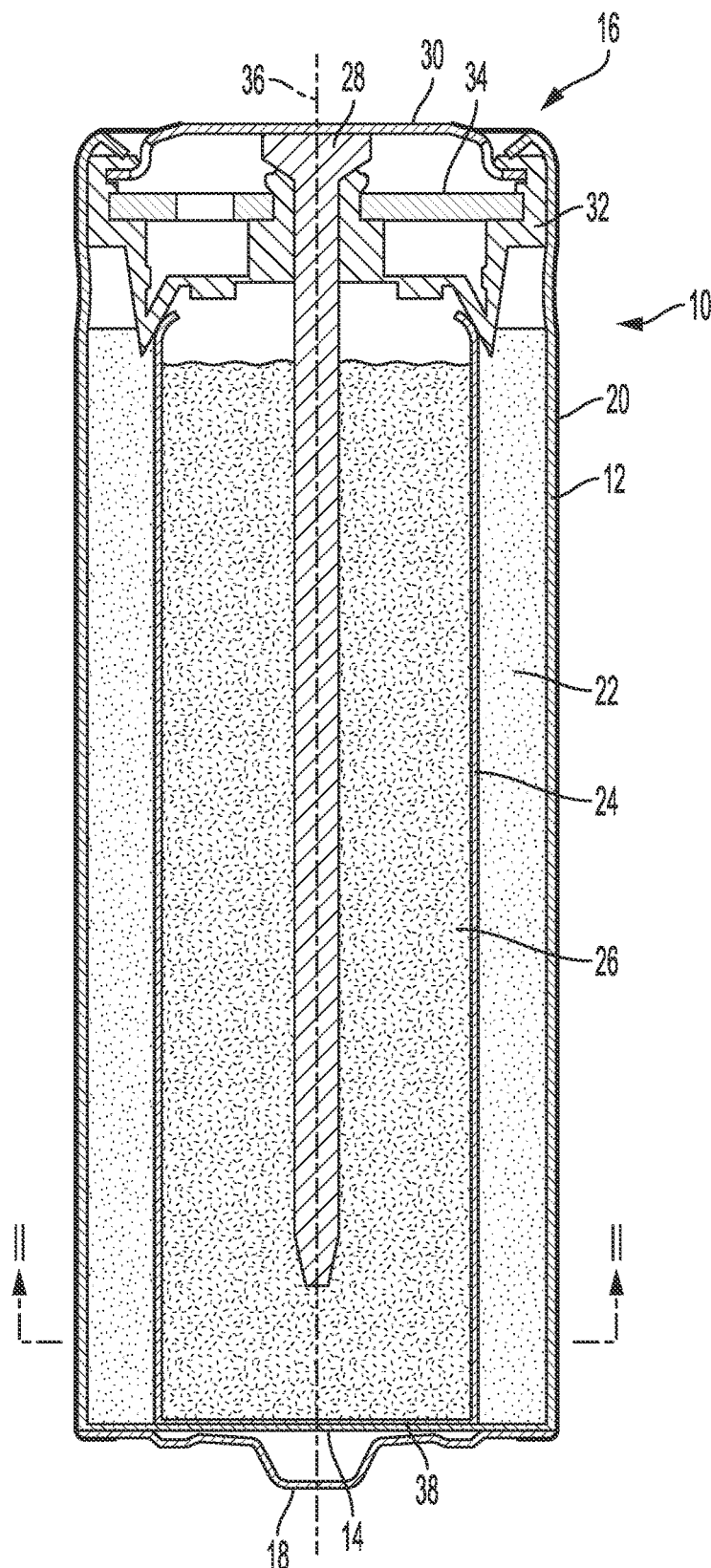
FIG. 1 shows a cross-sectional view of a conventional battery cell taken along the longitudinal axis of the cell.

Referring to FIG. 1, a conventional primary alkaline electrochemical battery cell 10 is shown. Cell 10 includes a housing, comprising a can with a side wall 12, a closed bottom end 14, and an open top end 16. A positive terminal cover 18 is welded or otherwise attached to can bottom 14. Alternatively, can bottom 14 may be formed to include the shape of positive terminal cover 18 in order to function as the positive terminal and eliminate the need for a separate cover. Assembled to the open top end 16 of the can is a cover and seal assembly and a negative terminal cover 30. A plastic film label 20 or other jacket may be formed about the exterior surface of the can side wall 12. Label 20 may extend over the peripheral edges of positive and negative terminal covers 18 and 30. A positive electrode (cathode) 22 is formed about the interior surface of the can. Cathode 22 is in direct contact with a portion of the can, and the can functions as the cathode current collector, providing electrical contact between cathode 22 and positive terminal cover 18. A negative electrode (anode) 26 is disposed within a cavity in cathode 22, with a separator 24 between cathode 22 and anode 26. A layer of separator 38 is also disposed between the anode 26 and the can bottom 14. An anode current collector 28 extends from negative terminal cover 30 into anode 26 to provide electrical contact between anode 26 and cover 30. An annular seal 32 is disposed in the open end 16 of the can to contain the electrode materials and electrolyte in the can. An inner cover 34 provides compressive support for seal 32 to achieve the desired level of resistance to leakage of materials from cell 10. Seal 32 also electrically insulates negative terminal cover 30 from the side wall 12 of the can. The cathode 22 and the anode 26 are coaxially disposed with respect to each other, sharing the longitudinal axis 36 of the cell 10 as a common axis.

Figure 2:
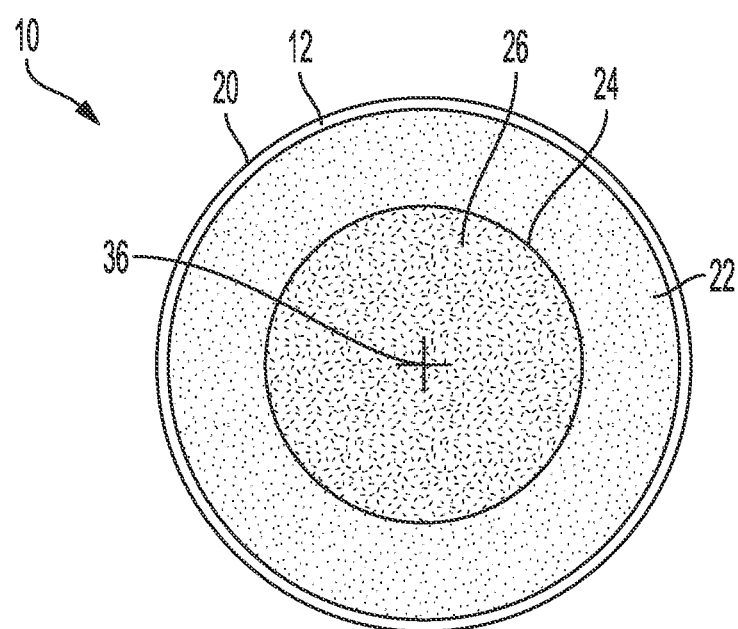
FIG. 2 is a cross-sectional view of the battery cell in FIG. 1, taken perpendicular to the longitudinal axis of the cell, at II-II.

FIG. 2 is cross-sectional view of the cell 10 in FIG. 1 taken at II-II. Cathode 22 has a hollow circular cylindrical shape with an internal surface that is generally smooth. The external surface of cathode 22 conforms generally to the shape of the internal surface of can side wall 12. The external surface of cathode 22 may be in direct contact with can side wall 12. Cathode 22 also has an internal surface, which defines a cavity. Anode 26 is disposed within the cylindrical cavity defined by the internal surface of cathode 22. Separator 24 is disposed between cathode 22 and anode 26.

Figure 3:
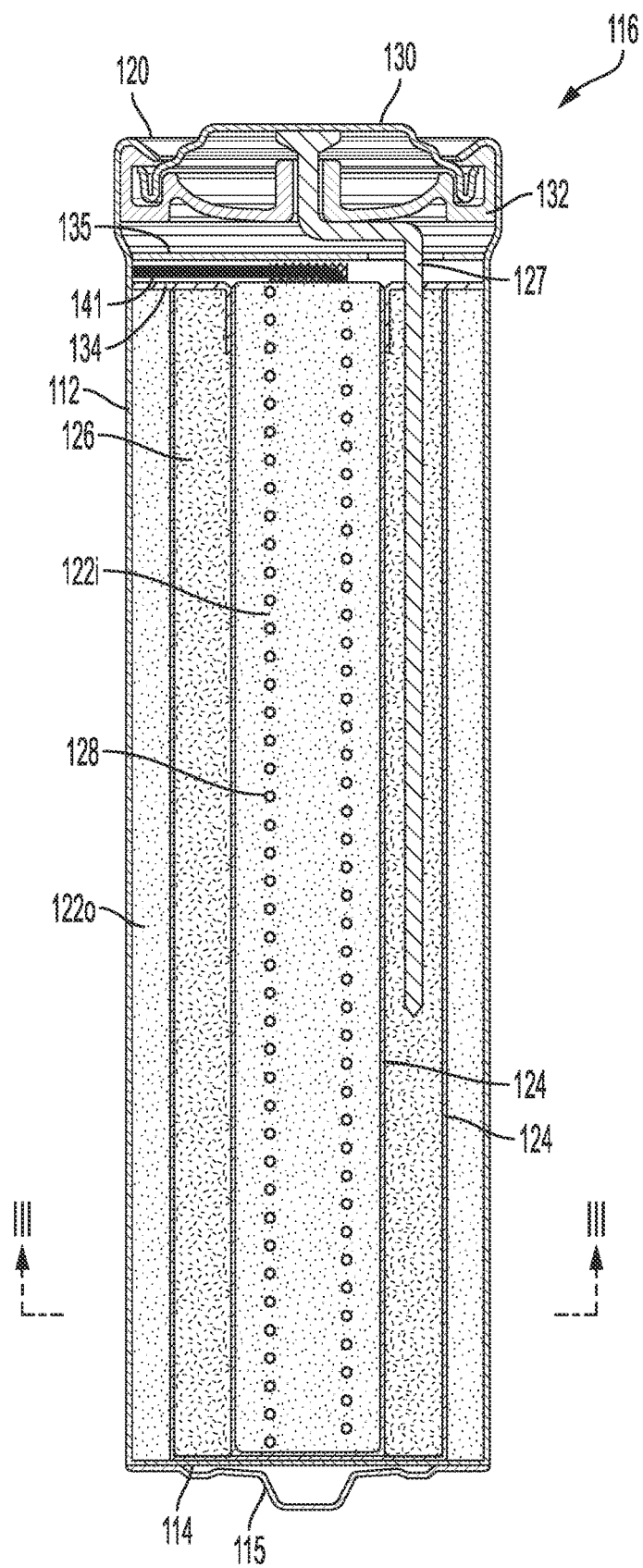
FIG. 3 shows a cross-sectional view of a battery according to various embodiments, taken along the longitudinal axis of the cell.
Figure 4:
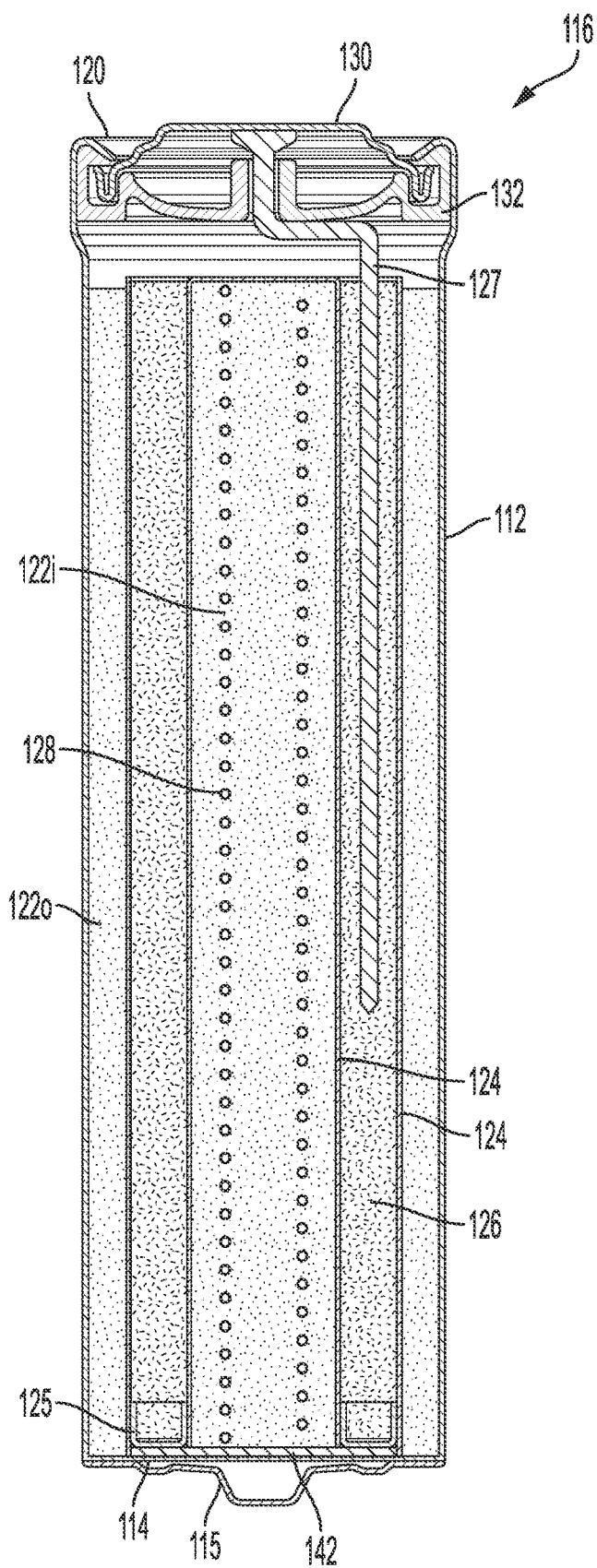
FIG. 4 shows a cross-sectional view of another battery according to various embodiments, taken along the longitudinal axis of the cell.
Figure 5:
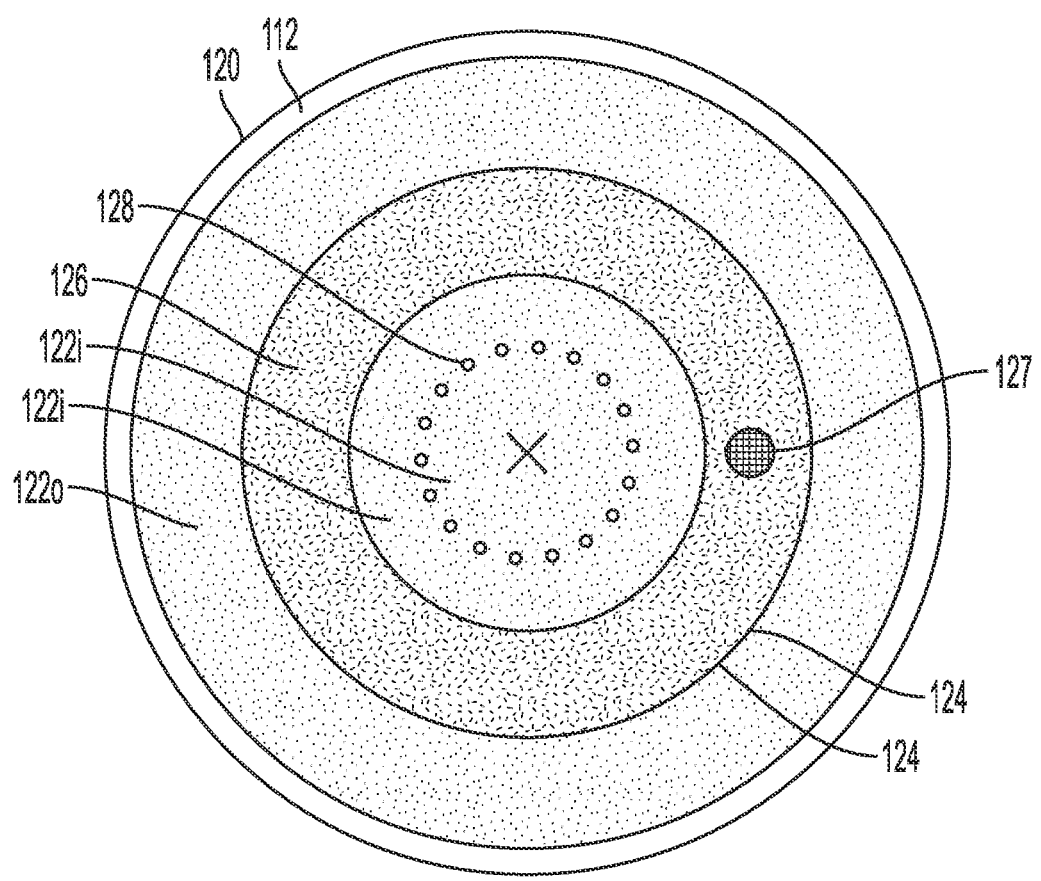
FIG. 5 is a cross-sectional view of the battery cell in FIG. 3, taken perpendicular to the longitudinal axis of the cell at III-III.
Figure 11:
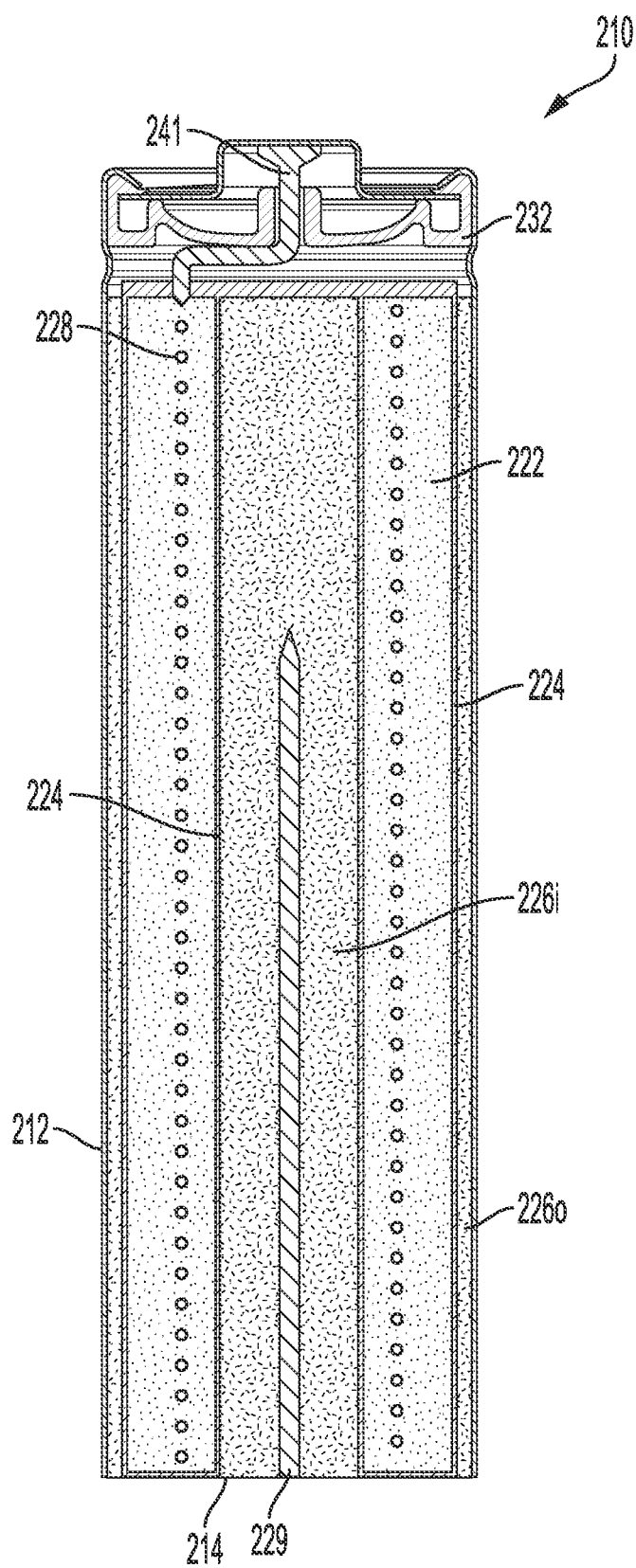
FIG. 11 shows a cross-sectional view of another battery according to various embodiments, taken along the longitudinal axis of the cell.

Example embodiments of a cell are shown in FIGS. 3-4. Cells 110 of FIGS. 3-4 constitute alkaline, Zinc-Manganese Dioxide (e.g., electrolytic Manganese Dioxide (EMD)) cells. The cell 110 comprises an outer cylindrical container having a closed end and an opposite open end 116, which may be defined as a can having sidewalls 112 and a can bottom 114 (which may itself define a terminal cover of the battery, such as a positive terminal cover, or which may have a separate terminal cover 115 attached (e.g., welded) thereto). The can may be embodied as a steel can, plated on its exterior surface with nickel. The open end 116 of the cell may be closed with an annular seal 132 comprising a polymeric material, such as nylon, polyethylene, polypropylene, and/or the like. In certain embodiments, the annular seal 132 may define a pressure relief vent configured to rupture if the cell's internal pressure becomes excessive. The cell may also comprise a cover 130 (e.g., metal cover) disposed in the open end 116 of the cell such that, when the top edge of the can is crimped inward and/or reduced in diameter, the cover 130 cooperates with the annular seal 132 and the can to compressively seal the electrodes and electrolyte in the cell 110. Moreover, the cover 130 may operate as a terminal cover (e.g., a negative terminal cover) of the cell 110. Cell components that may be exposed to the electrodes or electrolyte comprise materials that are nonreactive with the electrode materials and/or the electrolyte under expected conditions of cell storage and use. The cell can may define a pressure relief vent, which may be disposed in the seal, a cell cover, a can wall, and/or the like. Each electrode has a current collector to make electrical connection between the electrode and a respective cell contact terminal. The can may serve as a current collector for one electrode (e.g., cathode 122i, 122o), such as the electrode formed against the inner surface of the can sidewalls 112, in which case a coating containing carbon (e.g., graphite) may be applied to the interior surface of the can side wall 112 to improve electrical contact with the electrode (e.g., in embodiments such as those shown in FIG. 3, where a cathode 122o embodies the outermost electrode of the cell). However, it should be understood that in embodiments in which the effective surface area of the current collector of an electrode in contact with the can is desirably minimized (such as where an anode 226o is an outermost electrode of the cell, as shown in FIG. 11), at least a portion of the interior surface of the can side wall 112 may be coated with an insulating material to control the effective size of the current collector, as embodied by the can side wall 112.

Alternatively, the outer electrode may be electrically insulated from the can and may have a separate current collector (not shown). The cell 110 may also comprise one or more cell covers (e.g., positive terminal cover 115) that may serve as cell contact terminals. At least one of these cell contact terminals may be in electrical connection with the cell can (e.g., by welding the cell contact terminal 115 onto the exterior surface of the closed end 114 of the cell can). However, it should be understood that a portion of the can itself may define a cell contact terminal. For example, the closed end of the can may be formed in the shape of a contact terminal, thereby eliminating the need for a separate cover. Others of these cell contact terminals may be electrically insulated from the can (e.g., the negative terminal cover, embodied as outer cover 130 may be insulated from the positively-charged can by the above-mentioned annular seal 132) thereby enabling opposing ends of the battery cell 110 to have opposite electrical polarity of the battery cell 110, without short circuits defined therebetween.

In contrast to the cell 10 shown in FIGS. 1-2, Cell 110 of FIG. 3 includes a plurality of cathode layers, including an outer, ring-shaped cathode 122o and an inner cylindrical cathode 122i. The outer cathode 122o of the illustrated embodiment is disposed adjacent an interior surface of the can side wall 112 and surrounding an exterior surface of an annular anode 126 (separated by one or more separator 124 layers), which itself surrounds an exterior surface of an inner, cylindrical cathode 122i (separated by one or more separator 124 layers). Outer cathode 122o has a hollow, circular and cylindrical shape with an internal surface that is generally smooth. The external surface of the cathode 122o conforms generally to the shape of the internal surface of the can side wall 112. At least a portion of the external surface of the cathode 122o may be in direct contact with the can sidewall 112, thereby utilizing the can side wall 112 as a current collector for the cathode 122o. By utilizing the can side wall 112 as the current collector for the outer cathode 122o (the electrode locate adjacent to the can side wall 112), the cell design may minimize inactive materials in the form of a separate cathode current collector, which would otherwise occupy volume within the cell 110 that could otherwise be occupied by active materials The annular anode 126 is positioned between the outer cathode 122o and inner cathode 122i (separated from each by one or more separator 124 layers). As shown in FIG. 3, the annular anode 126 utilizes an anode current collector 127, which may be embodied as a nail extending from the negative terminal cover into the anode 126. The anode current collector 127 may be at least substantially linear, extending from the negative terminal cover 130 into the anode 126. However, in other embodiments the anode current collector 127 may be non-linear, such that the anode current collector 127 extends from a centerpoint of the negative terminal cover 130 (which is aligned with a central axis of the cell 110) into a portion of the anode 126, which itself is spaced apart from the center axis of the cell 110.

Because the inner cathode 122i is not in direct contact with the interior surface of the can side wall 12, the cell 110 has a separate current collector 128 corresponding with the inner cathode 122i. The current collector 128 comprises a material high in electrical conductivity, with sufficient strength and/or ductility to withstand the cell manufacturing process, and that is physically and chemically stable in the internal cell environment under expected conditions of storage and use. Materials suitable for use as cathode current collectors 128 in various embodiments comprise metal materials, such as steel, stainless steel, nickel, and/or alloys thereof. Such materials may be coated to provide additional conductive characteristics and/or to improve contact between the cathode current collector 128 and the cathode 122i. As just one example, a cathode current collector 128 may comprise a nickel mesh coated with graphite. As another example, the cathode current collector 128 may comprise a perforated nickel foil (e.g., coated with graphite). Other conductive materials may also be used (e.g., in the alternative or in combination), such as electrically conductive plastics, plastics having embedded conductive materials, and/or the like.

In the illustrated embodiment, the cathode current collector 128 comprises a cylindrical mesh extending longitudinally along the length of the inner cathode 122i. It should be understood that other configurations may be alternatively suitable, such as perforated sheets, expanded sheets, grids, crossed-wire sheets, and/or the like.

As shown in FIGS. 3-4, the cylindrical cathode current collector 128 may be embedded within the interior of the inner cathode 122i, such that the cathode current collector 128 is positioned at approximately the mid-point of a radius of the inner cathode 122i (e.g., such that the mesh current collector 128 is at least approximately equidistant between the central axis of the inner cathode 122i and the outer surface of the inner cathode 122i). In other words, the cathode current collector 128 may have a radius that is at least substantially half of the radius of the cathode 122, and both the cathode current collector 128 and the inner cathode 122i may have a central axis aligned with the longitudinal axis of the cell 110. As just one non-limiting example, for a LR6 battery, the inner cathode 122i may have a length of at least approximately 1.6 inches and a diameter of at least approximately 0.189 inches, and the embedded cathode current collector 128 may be formed by rolling a flat mesh around a round forming die having a diameter of 2 mm (approximately 0.0787 inches) to form a cathode current collector 128 having a diameter of approximately 0.0787 inches for inclusion within the inner cathode 122i.

It is thought that minimizing the distance between any portion of the cathode (e.g., inner cathode 122i) and the cathode current collector 128 with the foregoing configuration increases performances of the cell 110, possibly by decreasing the contact resistance between the collector and the cathode.

The cathode current collector 128 is electrically connected with the can side walls 112 (which operate as the current collector for the outer cathode 122o) via a conducting member. In the illustrated embodiment of FIG. 3, for example, the conducting member is embodied as a conducting tab 141 (e.g., a thin flat conducting strip, a conducting wire, and/or the like) electrically connected with the cathode current collector 128 (e.g., by welding) and electrically connected with the can side walls 112 (e.g., by welding). To electrically connect the cathode current collector 128 with the can side walls 112, the conducting tab passes across the top of the anode 126 ring, thereby electrically coupling the two cathode portions 122i, 122o. To ensure the positively charged conducting tab 141 remains electrically insulated from the negatively charged anode 126 and negatively charged anode current collector 127 (thereby avoiding a short-circuit scenario) insulating plates 134, 135 may be positioned below and above the conducting tab 141. The insulating plates 134, 135 may comprise an electrically insulating material (e.g., a nylon, a plastic, and/or the like) and the insulating plates may be configured so as to prevent undesired contact between the conducting tab 141 and any negatively charged portions of the cell 110. As shown, a lower insulating plate 134 may comprise an aperture aligned with an inner cathode 122i, thereby enabling the conducting tab 141 to exit a top surface of the inner cathode 122i so as to pass over the anode 126 and to contact a can side wall 112. The lower insulating plate 134 may additionally comprise a separate aperture enabling the anode current collector 127 to pass through the lower insulating plate 134 into the anode at a position spaced away from the conducting tab 141. Moreover, an upper insulating plate 135 is positioned between the conducting tab 141 and the anode current collector 127. As illustrated, the upper insulating plate 135 defines a single aperture enabling the anode current collector 127 to pass therethrough.

In other embodiments, such as that shown in FIG. 4, the conducting member may be embodied as a conducting plate 142 electrically connected with (e.g., welded) a bottom end of the cathode current collector 128 and electrically connected with an interior surface of the closed bottom end 114 of the cell can. In such embodiments, the anode 126 may be insulated from the cathode conducting plate 142 via a bottom cup 125 (e.g., comprising a separator material or another insulating material) preventing contact between the anode 126 and the cathode conducting plate 142. An analogous bottom cup may be utilized in the configuration discussed in reference to FIG. 3.

Figure 6:
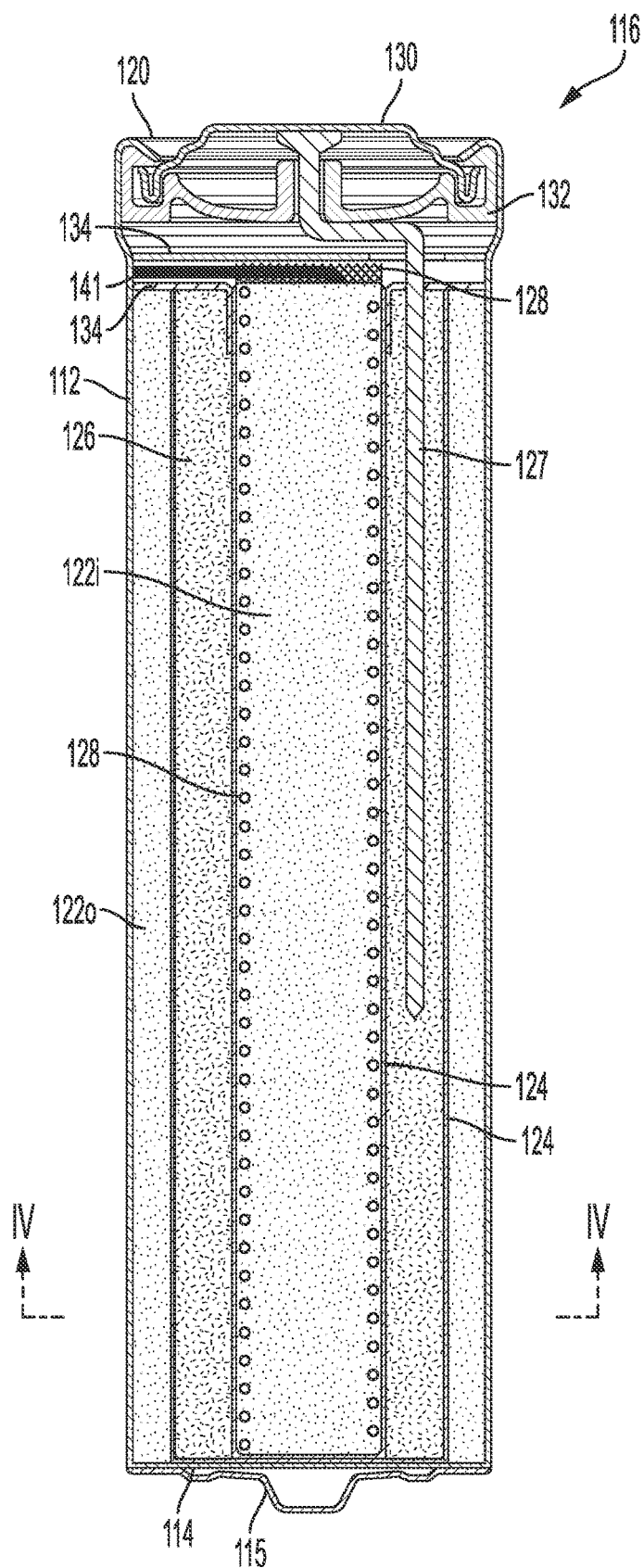
FIG. 6 shows a cross-sectional view of another battery according to various embodiments, taken along the longitudinal axis of the cell.

In other embodiments, such as those shown in FIG. 6, the cathode current collector 128 may be located at the exterior surface of the inner cathode 122i. However, it should be understood that the cylindrical cathode current collector 128 may be located at other locations along the radius of the inner cathode 122i. Moreover, in any of these embodiments, the cathode current collector 128 is electrically connected with the can side walls 112 via a conducting member, such as a conducting tab 141 and/or a conducting plate 142, as discussed in reference to FIGS. 3-4.

In yet other embodiments, the cathode current collector 128 may have other configurations. For example, the cathode current collector 128 may be defined as a coil-type current collector defined as a conductive wire coil having a spring-shape extending along the length of the inner cathode 122i. In such embodiments, the coil-type current collector extends at least partially along a length of the inner cathode 122i, and may be concentric with the inner cathode 122i (and the cell 110). In certain embodiments, the coil-type current collector may have a radius that is at least substantially half of the radius of the inner cathode 122i. However, it should be understood that the coil-type current collector may have other diameters, such as having a diameter at least substantially equal to the diameter of the inner cathode 122i, such that the coil-type current collector is embedded at the outer surface of the inner cathode 122i.

In yet other embodiments, the cathode current collector 128 may have other, non-cylindrical configurations. For example, the cathode current collector 128 may have an oblong cross-sectional shape (the center of which may be aligned with a central axis of the inner cathode 122i and the longitudinal axis 136 of the cell 110), a flat cross-section (the center of which may be aligned with a central axis/plane of the inner cathode 122i), a rectangular cross-section (the center of which may be aligned with a central axis of the inner cathode 122i), a solid central pin current collector (positioned concentric with the inner cathode 122i), and/or the like.

Figure 8:
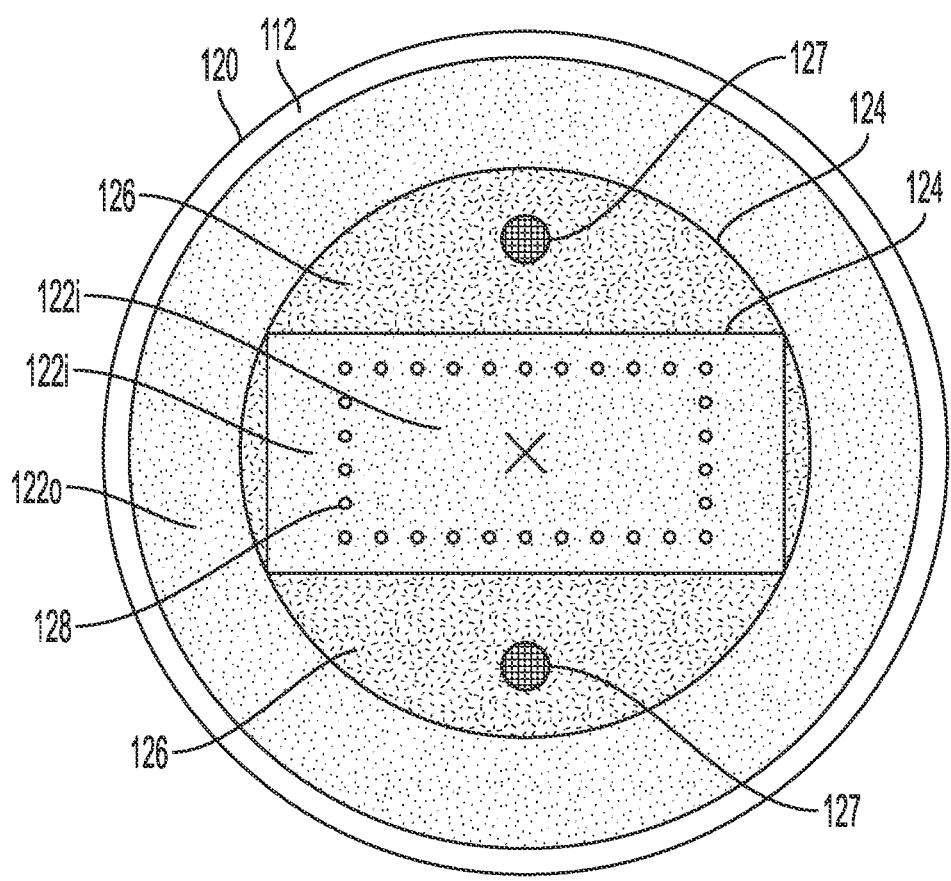
FIG. 8 is a cross-sectional view of another battery according to various embodiments, taken perpendicular to the longitudinal axis of the cell.
Figure 9:
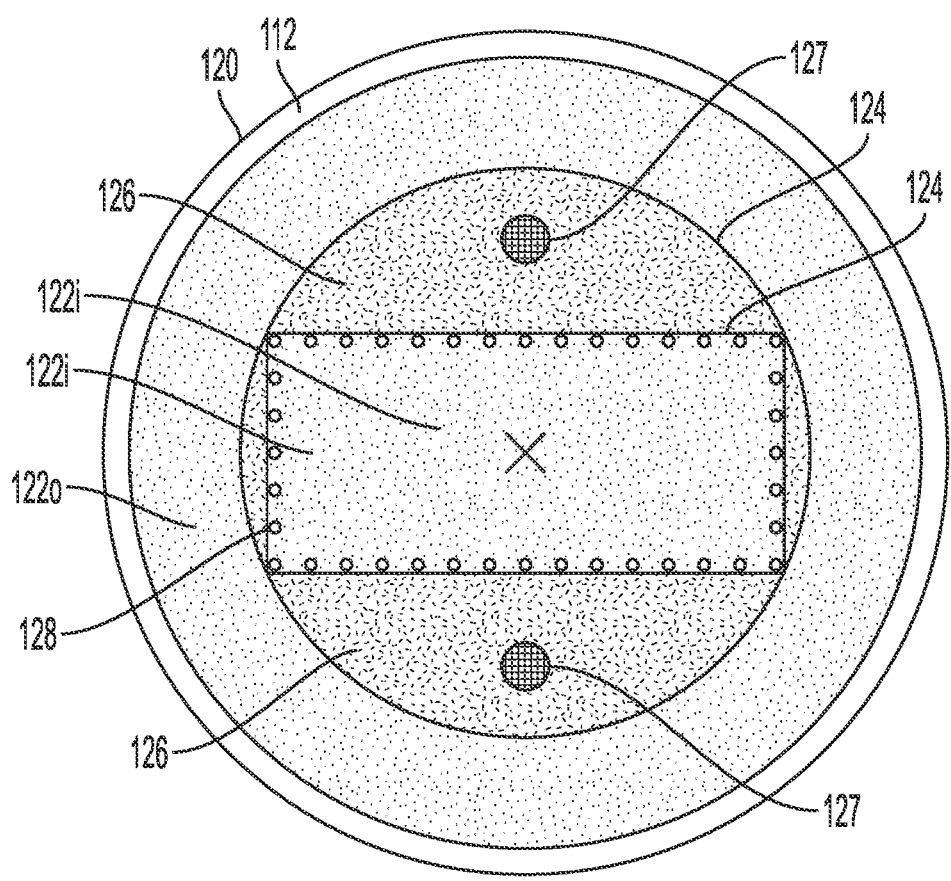
FIG. 9 is a cross-sectional view of another battery according to various embodiments, taken perpendicular to the longitudinal axis of the cell.

For example, FIGS. 8-9 illustrate cross-sectional views of alternative cell configurations in accordance with certain embodiments. As shown therein, the outer cathode 122o surrounds a plurality of anode portions 126 (e.g., two anode portions 126 in the shown embodiments of FIGS. 8-9) positioned on opposing sides of the inner cathode 122i. As shown in the illustrated embodiment, the outer cathode 122o has a cylindrical configuration with a cylindrical interior opening. The plurality of anode portions 126 have an outer surface contoured with a portion of the interior surface of the outer cathode 122o and contoured to an outer surface of an at least substantially rectangular inner cathode 122i. Such a configuration gives the anode portions 126 a "D"-shape, having an at least substantially linear side and an at least substantially curved side. The anode portions 126 are separated from the outer cathode 122o and the inner cathode 122i by one or more separator 124 layers. In the illustrated embodiment, the separator 124 positioned between the outer cathode 122o and the anode portions 126 may extend around the entirety of the interior surface of the outer cathode 122o. In such embodiments, an exterior surface of the inner cathode 122i may be surrounded by a separator 124 to separate the inner cathode 122i from the separator portions 126. In other embodiments, the separator 124 may extend around each individual anode portion 126, thereby separating the anode portions 126 from each of the inner cathode 122i and outer cathode 122o, which maintains electrical contact between the outer cathode 122o and inner cathode 122i.

In the illustrated embodiments of FIGS. 8-9, the anode portions 126 may each have associated anode current collectors 127, which may be embodied as individual nails extending between a negative terminal cover and respective anode portions 126 as discussed above in reference to FIGS. 3-4.

Moreover, in the illustrated embodiment of FIGS. 8-9, the inner cathode 122i has an at least substantially rectangular cross section (e.g., having four at least substantially linear sides; having two at least substantially linear sides and having two curved sides conforming to the contour of the interior wall of the outer cathode 122o), and the included cathode current collector 128 has a shape corresponding to the shape of the inner cathode 122i. As shown in FIGS. 8-9, for example, the cathode current collector has an at least substantially rectangular shape corresponding to the at least substantially rectangular shape of the inner cathode 122i. Moreover, as shown specifically in the embodiment of FIG. 8, for example, the cathode current collector 128 may have sidewall lengths at least substantially half of the sidewall lengths of the inner cathode 122i. In other embodiments, such as that shown in FIG. 9, the cathode current collector 128 may have sidewall lengths at least substantially similar to the sidewall lengths of the inner cathode 122i, as the cathode current collector 128 may be embedded within the exterior surface of the inner cathode 122i. It should be understood that the inner cathode 122i may have any of a variety of alternative shapes (e.g., triangle, pentagon, hexagon, and/or the like) and the cathode current collector 128 may have a shape corresponding to the shape of the inner cathode 122i.

FIG. 11 illustrates yet another example cell 210 having an "inside-out" design, with a single, annular cathode 222 positioned between a central anode 226i and an outer anode 226o (having a separator 224 located between the cathode 222 and inner anode 226i and between the cathode 222 and the outer anode 226o). In the illustrated embodiment of FIG. 11, the can side wall 212 functions as a current collector for the outer anode 226o, and the closed bottom end 214 functions as a negative terminal of the cell 210. Thus, Cell 210 of FIG. 11 includes an outer, ring-shaped anode 226o disposed adjacent an interior surface of the can side wall 212 and surrounding the cathode 222 defined within a cavity formed by the outer anode 226o. Moreover, the cathode 222 is ring-shaped and surrounds the inner anode 226i. Separator 224 is disposed between the outer anode 226o and the cathode 222 and is disposed between the inner anode 226i and the cathode 222. The outer, ring-shaped anode 226o has a hollow, circular and cylindrical shape with an internal surface that is generally smooth. The external surface of the outer anode 226o conforms generally to the shape of the internal surface of the can side wall 212. At least a portion of the external surface of the outer anode 226o may be in direct contact with the can side wall 212, thereby utilizing the can side wall 212 as a current collector for the outer anode 226o. By utilizing the can side wall 212 as the current collector for the outer anode 226o (the electrode located adjacent to the can side wall 212), the cell design may minimize inactive materials in the form of a separate anode current collector, which would occupy volume within the cell 210 that could otherwise be occupied by active materials. When the anode active material has a lower electrochemical redox potential in aqueous solution than the hydrogen redox potential, the hydrogen gassing rate from the inner surface of the can side wall 212, which is in contact with the anode 226, can be very high. Without appropriate accommodations, this high hydrogen gassing rate could lead to leakage of the aqueous electrolyte from the cell. Thus, the interior surface of the can side wall 212 may be plated with a tin or an alloy of copper, tin, and/or zinc to substantially reduce the gassing rate at the anode/can interface. In such embodiments, a closed end 214 of the can may be embodied as a negative terminal of the cell 210. Moreover, as shown in FIG. 11, a central anode current collector 229 (e.g., embodied as a nail) may be electrically connected with the can (e.g., by welding the anode current collector 229 to the closed bottom end of the can) and may extend into the inner anode 226i to operate as a current collector for the central anode 226i. It should be understood that other embodiments (not shown) may comprise a single, central cathode and a single anode (located around an exterior of the single cathode).

In other embodiments (not shown), an outer anode 226o is electrically insulated from the can side wall 212 (e.g., by placement of a separator layer between the anode and the can side wall 212, by coating the can side wall with an insulating material, and/or the like), and is instead in electrical contact with a current collector (not shown) electrically connected with a negative terminal of the cell 210. In various embodiments, suitable materials for use as an anode current collector may comprise copper and its alloys with zinc, and/or tin. Anode current collectors may be alloyed and/or coated with a metal having a high hydrogen overvoltage, such as zinc, indium, or tin, to reduce hydrogen gas generation during storage and discharge of the cell. Thus, when utilizing the cell can side wall 212 as the anode current collector, the interior surface (or a portion thereof) may be coated with such a material to minimize hydrogen off gassing of the anode during storage and discharge of the cell 110.

Cell 210 also has an annular seal 232 to seal the interior of the battery and to electrically insulate the positive terminal cover 218 from the negatively charged can 212. Moreover, as discussed in reference to other inner cathode configurations discussed above, the cathode 222 may have an associated cathode current collector 228 (e.g., a mesh material) embedded therein. The cathode current collector 228 may be located within the interior of the cathode 222 and may have a shape corresponding to the shape of the cathode 222. For example, in the embodiment of FIG. 11, the cathode 222 may have a cylindrical shape, and the cathode current collector 228 may have a similar cylindrical shape. The cathode current collector 228 has a radius at least substantially half of the radius of the cathode 222. However, it should be understood that the cathode current collector 228 may have a size at least substantially similar to the size of the cathode 222. For example, the cathode current collector 228 may be embedded within an exterior surface of the cathode 222.

Moreover, as shown in the embodiment of FIG. 11 the positive terminal cover 218 may be welded or otherwise electrically connected to the cathode current collector 228 via conducting member 241 (e.g., embodied as a conductive tab, a conductive nail, or a combination thereof). An insulating jacket, such as the plastic film layer 220, and a negative terminal cover (not shown), may also be included in embodiments of cell 210. Moreover, as shown in FIG. 11, the separator 224 of the cell may comprise a closed bottom end 238 to electrically insulate the positively charged cathode 222 from the negatively charged can (specifically, from the negatively charged closed bottom end 214 of the can).

In certain embodiments, the cathode (e.g., outer cathode 122o, inner cathode 122i, or cathode 222, depending on configuration) comprises a manganese oxide as a positive active material. The manganese oxide may be any manganese oxide suitable as an active material in an alkaline zinc-manganese oxide cell. Manganese oxide suitable for use in various embodiments may have a molecular formula close to $MnO_2$, and may therefore be referred to as manganese dioxide. Examples of manganese oxides that may be used are natural manganese dioxides (NMD), chemical manganese dioxides (CMD), and electrolytic manganese dioxides (EMD). EMD typically has the greatest theoretical capacity because of its relatively high level of purity and high density.

In certain embodiments, the cathode (e.g., outer cathode 122o, inner cathode 122i, or cathode 222, depending on configuration) may comprise another positive active material besides a manganese oxide. Suitable alternative cathode active materials may be compatible with manganese oxide used in the cell and may be selected and included to provide the cell with certain desired voltage and/or discharge characteristics. Examples of alternative active materials that may be used in combination with, and/or as an alternative to manganese oxide include, but are not limited to, silver oxides, nickel oxides (e.g., $Li_xNi_yM_zO_2$, wherein $x<0.2$, $y\geq0.6$, $z\leq0.4$), nickel oxyhydroxide and/or the like.

The cathode may contain other, non-active materials that provide desirable discharge characteristics of the cathode. For example, a conductive material, such as a carbon material (e.g., graphite, graphitized carbons, and/or the like), may be included within the cathode to improve the electrical conductivity of the cathode. Suitable graphites include natural and synthetic graphites, unexpanded or expanded graphites, and can be in a variety of forms, including powders, flakes, fibers, and/or the like.

Moreover, cathodes of certain embodiments additionally include one or more binder materials. Suitable binder materials include polytetrafluoroethylenes, polyethylenes, diblock copolymers of styrene, ethylene and propylene, polyacrylic acids, and poly (acrylic acid-co-sodium-4-styrene sulfonate). Binder materials may be used singly or in combination, such as a blend (e.g., 3:1 by weight) of polytetrafluoroethylene and polyacrylic acid. It is generally desirable to keep the amount of binder to a minimum, but the amount used in any given electrode may vary, for example, based on the desired strength of the cathode for the manufacturing process used. As a non-limiting example, a binder may be provided in the range from about 0.1 to 6.0 weight percent of the weight of the cathode (e.g., between 0.2 wt % to 2.0 wt %).

Additional additives may be included with the cathode of certain embodiments. Such additives may include, but are not limited to, barium sulfate, titanium dioxide, n-type titanium dioxide, and/or the like. Such additives may be provided, for example, to improve discharge performance.

A small amount of water (e.g., 1.5 to 8.0 percent, based on the weight of the solid cathode materials), either with or without electrolyte salt dissolved therein, may be mixed with the dry cathode ingredients to achieve a desired consistency for cathode forming.

In certain embodiments, the volume percent solids in the cathode is greater than or equal to 60 vol %. More preferably, a volume percent solids of the cathode being greater than or equal to 70 vol % provides improved low rate discharge performance. At least 75 vol % solids packing is preferred, for example, between 76 vol % to 78 vol %.

The anode (e.g., anode 126 or anode 226) of an alkaline $Zn/MnO_2$ cell may comprise a mixture of gelled zinc particles, an electrically conductive material, solid zinc oxide, and a surfactant. The anode may optionally include other additives, for example, a binder or gelling agent, and/or the like. The zinc may be in powder, mesh, wool, foam, 3D structure with well-defined pore size/shape or flake form, or a combination thereof. An amalgamated zinc alloy comprising bismuth, indium, and aluminum may be advantageous. Zinc powder, for example, having a $d_{50}$ of about 110 μm may be utilized. The anode may additionally comprise water, electrolyte (e.g., potassium hydroxide), and a gelling agent (e.g., acrylic acid). Other additives may be included in the anode 126 as well, such as gassing inhibitors (e.g., $In(OH)_3$, ZnO, and sodium silicate), and/or other additives providing desirable anode characteristics may be provided. In an embodiment, the anode comprises a gelled electrolyte, wherein the gelled electrolyte is prepared by combining a gelling agent with a first aqueous alkaline electrolyte solution, wherein the first aqueous alkaline electrolyte solution comprises an alkaline metal hydroxide electrolyte and dissolved zinc oxide. In a further embodiment, the first aqueous alkaline electrolyte solution comprises dissolved zinc oxide in an amount of $\geq2.5$, $\geq2.6$, $\geq2.7$, $\geq2.8$, $\geq2.9$, $\geq3.0$, $\geq3.1$, $\geq3.2$, $\geq3.3$, $\geq3.4$, $\geq3.5$, $\geq3.6$, $\geq3.7$, $\geq3.8$, $\geq3.9$, or $\geq4.0$ weight percent. In an embodiment, the first aqueous alkaline electrolyte solution comprises dissolved zinc oxide in an amount of about 2.7-3.3 weight percent.

The anode may have a solids content of at least 27 vol % solids. In some embodiments, the anode may have a 31.5 vol % or higher solids percent. Zinc concentrations of 66 wt % or higher, for example between 70 to 76 wt % provide excellent discharge characteristics on low rate and high rate discharge. The anode may be sufficiently gelatinous so as to flow and conform to the shape of a container. As discussed herein, the gelled anode may, in certain embodiments, be poured/extruded/provided into an interior opening of an outer cathode ring (separated by a separator layer), and then an inner cathode (having a separator layer coated therein) may be inserted into the center of the gelled anode, thereby displacing the anode into the anode ring between the inner cathode portion and the outer cathode portion.

In certain embodiments, a cell according to various embodiments may have an anode to cathode (A:C) ratio between about 1-1.3 (including both the inner cathode and the outer cathode, if applicable, within the calculation). As just one example, an LR6 battery having an outer cathode and an inner cathode (e.g., having a configuration according to one of FIGS. 3-4, may have an outer cathode thickness of about 0.011 to 0.094 inches, preferably about 0.029 to 0.081 inches, and more preferably about 0.048 to 0.075 inches, and an inner cathode diameter of about 0.406 to 0.136 inches, preferably about 0.358 to 0.192 inches, and more preferably about 0.303 to 0.215 inches. The anode ring, positioned between the outer cathode and the inner cathode, may have a thickness of about 0.054 to 0.105 inches, preferably about 0.059 to 0.090 inches, and more preferably about 0.068 to 0.084 inches.

The electrolyte may comprise KOH. The total KOH concentration in the electrolyte in a completed, undischarged cell may be from about 25 to about 50 wt %, generally from about 36 to about 40 wt %.

A surfactant that is either a nonionic or anionic surfactant, or a combination thereof is present in the anode. It has been found that anode resistance is increased during discharge by the addition of solid zinc oxide alone, but is mitigated by the addition of the surfactant. The addition of the surfactant increases the surface charge density of the solid zinc oxide and lowers anode resistance as indicated above. Use of a surfactant is believed to aid in forming a more porous discharge product when the surfactant adsorbs on the solid zinc oxide. When the surfactant is anionic, it carries a negative charge and, in alkaline solution, surfactant adsorbed on the surface of the solid zinc oxide is believed to change the surface charge density of the solid zinc oxide particle surfaces. The adsorbed surfactant is believed to cause a repulsive electrostatic interaction between the solid zinc oxide particles. It is believed that the surfactant reduces anode resistance increase caused by the addition of solid zinc oxide because the adsorbed surfactant on solid zinc oxide results in enhanced surface charge density of solid zinc oxide particle surface. The higher the BET surface area of solid zinc oxide, the more surfactant can be adsorbed on the solid zinc oxide surface.

The anode comprises solid zinc oxide in an amount from about 0.5 to 5 weight percent, based on the total weight of the anode. In a preferred embodiment, the anode comprises solid zinc oxide in an amount from about 1 to 4 weight percent. In an embodiment, the solid zinc oxide is substituted, so as to reduce its solubility.

Other components which may be optionally present within the anode include, but are not limited to, gassing inhibitors, organic or inorganic anticorrosive agents, plating agents, binders or other surfactants. Examples of gassing inhibitors or anticorrosive agents can include indium salts, such as indium hydroxide, perfluoroalkyl ammonium salts, alkali metal sulfides, etc. In a further embodiment, sodium silicate in an amount of about 0.3 weight percent based on the total weight of the anode electrolyte is preferred in the anode in order to substantially prevent cell shorting through the separator (e.g., separator 124 or separator 224) during cell discharge.

Method of Manufacture

A central cathode (e.g., inner cathode 122*i* and/or cathode 222) in accordance with various embodiments may be formed via one or more manufacturing methods. The central cathode may be formed outside of the cell can, or may be formed in place within the cell can.

Before forming the cathode, the cathode current collector may be formed, by wrapping a current collector material (e.g., a current collector mesh, a perforated foil, a wire, and/or the like) around a die having a cross-sectional shape corresponding to the desired shape of the current collector. For example, to form a cylindrical cathode current collector, the mesh current collector material may be wrapped around a cylindrical die. In certain embodiments, the current collector material may be wrapped until opposing edges meet. In other embodiments, the current collector material may be wrapped until opposing edges overlap at least partially. The opposing edges may be secured relative to one another (e.g., via spot welding) to maintain the desired cross-sectional shape of the current collector. In various embodiments, such as those forming a current collector for placement within an embodiment configured in accordance with FIG. 3 or FIG. 4 discussed herein, a conducting member, such as a conducting tab 141 or a conducting plate 142 is secured relative to the current collector (e.g., by welding).

As just one example, the central cathode may be molded outside of the cell can. The central cathode may be formed as a single, continuous piece, by filling a mold with a cathode mixture (as discussed above), and subjecting the cathode mixture within the mold to a high pressure to form the cathode cylinder. In certain embodiments, the cathode current collector 128, 228 may be positioned within the central cathode mold prior to filling the mold with the cathode mixture, and the cathode mixture may then be added to the central cathode mold around the current collector, such that it falls within the openings of the current collector. For example, a plug may be added to an end of the central current collector, such that the cathode material first fills the region between the walls of the mold and the exterior surface of the current collector. Thereafter, the plug may be removed, and cathode material may be added to the interior of the current collector. The combination of the cathode material and the current collector mesh may then be subject to a high pressure to form the cylindrical cathode with embedded cathode current collector. As discussed herein, the cathode current collector 128, 228 may comprise a cylindrical mesh material (e.g., having opposite open ends) with a conductive tab 141 extending from one longitudinal end, that may be positioned at least substantially coaxially with the central cathode (and accordingly with the cathode mold, during manufacturing) at a medial radial location (e.g., midway between the central axis of the cathode/cathode mold and the outer surface of the cathode/cathode mold. As noted, the conducting tab 141 may be connected (e.g., via welding) before forming the cathode with integrated current collector, or after forming the cathode with the integrated current collector. In other embodiments comprising a conducting plate 142, the conducting plate 142 may be attached (e.g., via welding) relative to the cathode current collector prior to forming the cathode with integrated current collector. In other embodiments, the conducting plate 142 may be attached (e.g., via welding) relative to the cathode current collector after forming the cathode with integrated current collector.

It should be understood that press-molding the cathode with the integrated cathode current collector may not result in a substantial change in length of the cathode current collector, and therefore the cathode current collector mesh does not apply a substantial expanding, tensile force to the resulting cylindrical cathode. In other embodiments, the cathode current collector may be compressed during formation of the cathode with integrated cathode current collector. However, the cathode current collector may be characterized by a low spring force, and accordingly the cathode current collector may not apply a substantial expanding, tensile force to the resulting cylindrical cathode 122.

As another example, the central cathode may be formed as a single, continuous piece, by filling a mold with a cathode mixture (as discussed above), and subjecting the cathode mixture within the mold to a high pressure to form the cathode cylinder. The central cathode may be formed without the cathode current collector embedded therein. After removing the central cathode from the forming mold, the current collector (e.g., current collector mesh) may be rolled around the exterior of the cathode cylinder to form the cathode current collector. The cathode current collector may have a diameter slightly smaller than the diameter of the resulting central cathode, such that the cathode current collector is pressed into the surface of the central cathode, such that the cathode current collector is positioned within the diameter of the central cathode.

As yet another example, the central cathode may be formed as a combination of a plurality of cathode pellets, each cathode pellet being a cylindrical cathode pellet having a diameter equal to the diameter of the resulting cathode. Each cathode pellet may be molded, by filling a mold with cathode material and pressing the cathode material to form the cathode pellet. As one non-limiting example, a cathode pellet for a LR6 cell may be formed within a die having a diameter of 0.189 inches. 0.755 g of cathode mix is added to the die and pressed at 2600 lb of force to form a cathode pellet having a length of 0.494 inches and a diameter of 0.189 inches. A plurality of cathode pellets may be stacked end-to-end (e.g., 4 cathode pellets) to form the length of the cathode. The current collector mesh may be rolled around the exterior of the stack of the plurality of cathode pellets to form the cylindrical current collector. The cylindrical current collector may have a diameter slightly smaller than the diameter of the resulting central cathode, such that the cylindrical current collector mesh is pressed into the surface of the central cathode, such that the cylindrical current collector is positioned within the diameter of the central current collector. In such embodiments, the current collector mesh structurally connects the plurality of cathode pellets, to provide a single cathode structure with sufficient strength and resilience to withstand handling during the cell manufacturing process (e.g., specifically, to withstand placement of a separator around an exterior surface of the cathode and/or placement of the cathode (with or without wrapped separator) into the cell can).

As yet another example manufacturing technique, the central cathode may be extruded, for example with or without an included cathode current collector. As just one specific example, an at least substantially continuous cathode current collector tube (e.g., comprising a cathode current collector mesh) may be fed through a generally cylindrical extrusion die, while simultaneously the cathode material is extruded through the same extrusion die. The cathode current collector tube is positioned as desired within the extrusion die to generate a cathode structure with an embedded cathode current collector in a desired position. As noted above, the cathode current collector may be positioned at a mid-point on the radius of the cathode, and accordingly the cathode current collector may be positioned substantially at a mid-point on the radius of the extrusion die. As cathode material is simultaneously extruded through the extrusion die, the cathode material fills the apertures of the mesh to create an at least substantially continuous cathode structure having a desired solids packing percentage. It should be understood that the cathode current collector may have a feed rate through the extrusion die at least substantially equal to the feed rate of the cathode material through the feed die, thereby avoiding undesirable tensile or compressive forces internal to the cathode structure that may decrease the strength and/or resilience of the cathode structure to remaining steps of the cell manufacturing process.

As the cathode structure is extruded, individual cathodes may be cut from the continuous cathode cylinder extending from the extrusion die.

As mentioned above, the cathode material may be extruded without an embedded cathode current collector. In such embodiments, the cathode material may be fed through the extrusion die to create a cylindrical cathode. The cathode structure may be cut to length to form cathodes for positioning within cell cans. After extrusion (and either before or after cutting the cathodes to length) the current collector mesh may be rolled around the exterior of the cathode to form the cathode current collector. The cathode current collector may have a diameter slightly smaller than the diameter of the resulting central cathode, such that the cathode current collector mesh is pressed into the surface of the central cathode, such that the cathode current collector is positioned within the diameter of the central cathode.

As alluded to above, the separator may be wrapped around an exterior surface of the cathode prior to placement of the same within the cell can. In certain embodiments, the separator may overlap one or both ends of the cathode structure, thereby providing insulting properties to one or both ends of the cathode structure to prevent undesirable short circuits between the cathode and the anode (or anode current collector) within the completed cell. However, it should be understood that the separator may be placed within the cell can prior to placement of the cathode structure within the cell can, as may be desired according to certain manufacturing techniques.

The separator comprises an ionically conductive, electrically insulating material to separate the anode and cathode within the cell. The separator maintains a physical dielectric separation of the cathode's electrochemically active material from the electrochemically active material of the anode and allows for transport of ions between the electrode materials. In addition, the separator acts as a wicking medium for the electrolyte and as a collar that prevents fragmented portions of the negative electrode from contacting the top of the positive electrode. Separator can be a layered ion permeable, non-woven fibrous fabric. A typical separator usually includes two or more layers of paper. The separator may be formed either by pre-forming the separator material into a cup-shaped basket having a closed bottom portion that is subsequently inserted into a cavity defined by anode and the closed end of the can (if the anode is inserted prior to the central cathode), or forming a basket during cell assembly by inserting two rectangular sheets of separator into the cavity with the material angularly rotated 90° relative to each other. Conventional pre-formed separators are typically made up of a sheet of non-woven fabric rolled into a cylindrical shape that conforms to the inside walls of the anode and has a closed bottom end.

The anode can be formed in a number of different ways as known in the art. For example, the anode components can be dry blended and added to the cell, with alkaline electrolyte being added separately or a pre-gelled anode process is utilized.

In one embodiment, the zinc and solid zinc oxide powders, and other optional powders other than the gelling agent, are combined and mixed. Afterwards, the surfactant is introduced into the mixture containing the zinc and solid zinc oxide. A pre-gel comprising alkaline electrolyte solution, soluble zinc oxide and gelling agent, and optionally other liquid components, are introduced to the surfactant, zinc and solid zinc oxide mixture which are further mixed to obtain a substantially homogenous mixture before addition to the cell. Alternatively, in a further preferred embodiment, the solid zinc oxide is predispersed in an anode pre-gel comprising the alkaline electrolyte, gelling agent, soluble zinc oxide and other desired liquids, and blended, such as for about 15 minutes. The solid zinc oxide and surfactant are then added and the anode is blended for an additional period of time, such as about 20 minutes. The amount of gelled electrolyte utilized in the anode is generally from about 25 to about 35 weight percent, and for example, about 32 weight percent based on the total weight of the anode. Volume percent of the gelled electrolyte may be about 70% based on the total volume of the anode 126.

The anode may be inserted into the cell in any suitable manner. If an anode is flowable when it is added to the cell, it may be disposed as a liquid to flow to fill the space between the central cathode (and separator) and the can side wall (or the interior surface of an outer cathode 122o (and separator) as discussed herein). Thus, the anode may be added into the can after placement of the outer cathode 122o and separator within the interior of the cell can. The inner cathode 122i (and associated separator) may be added to the interior of the cell after adding the flowable anode material thereto. As the inner cathode 122i is added to the cell, the anode material is displaced into the region between the inner cathode 122i and outer cathode 122o. Because the inner cathode 122i is added together with the corresponding separator, the anode material does not contact the cathode material during insertion of the inner cathode.

In other embodiments, the flowable anode material may be dispersed into the cell after placement of the both outer cathode 122o and inner cathode 122i. For example, in embodiments including a bottom conductor plate 142 secured relative to the inner cathode 122i, the inner cathode 122i may be placed within the cell prior to placement of the anode material therein. Moreover, after placement of the inner cathode 122i and outer cathode 122o within the cell, a bottom cup 125 (e.g., comprising a separator material and/or another insulator material) may be placed within the cell, between the outer cathode 122o and inner cathode 122i prior to placement of the anode material therein, so as to maintain electrical insulation between the anode material and the cathode's conducting plate 142.

In other embodiments, the anode may be dispensed into the cell under pressure, for example, by extrusion. If an anode is a solid, such as a packed mass of particulate anode material or a continuous 3 dimensional (3D) anode (e.g., comprising an active material of zinc and/or one or more additives), the anode may be formed into a desired shape prior to insertion of the same into the cell. In such embodiments, the anode may be added to the cell can after the outer cathode 122o and/or the inner cathode 122i (or central cathode 222), as mentioned above. In embodiments including an inner cathode 122i and outer cathode 122o, the anode 126 may be positioned within the cell after placement of the outer cathode 122o (which may be formed in place via impact molding and/or which may be formed outside of the cell, for example, via ring molding, and added to the cell can) but before placement of the inner cathode 122i.

Moreover, the anode may be formed into a desired shape outside of the cell (e.g., by ring molding the anode into one or more anode rings that may be added to fill the cell can with a desired anode quantity). In such embodiments, a plurality of anode rings (e.g., 3 or 4 anode rings) may be individually placed into the cell can to provide a desired quantity of anode therein. In other embodiments, a single anode tube (a cylindrical anode having an open center) may provide the entire quantity of anode material desired for a particular cell 110. Thereafter, the separator and cathode material may be added to the central opening of the anode (in one or more steps).

In other embodiments, the anode may be formed into a desired ring shape within the cell can. For example, impact molding may be utilized, by pouring particulate anode active material into the cell can, and inserting a ram into the center of the cell can to impact mold the anode material into a ring pressed against an interior surface of the cell can. Thereafter, the separator and cathode material may be added to the central opening of the anode (in one or more steps).

In addition to the aqueous alkaline electrolyte absorbed by the gelling agent during the anode manufacturing process, an additional quantity of an aqueous solution of alkaline metal hydroxide, i.e., "free electrolyte," may added to the cell during the manufacturing process. The free electrolyte may be incorporated into the cell by disposing it into the cavity defined by the cathode or anode, or combinations thereof. The method used to incorporate free electrolyte into the cell 110 is not critical provided it is in contact with the anode, cathode, and separator. In one embodiment, free electrolyte is added both prior to addition of the anode mixture as well as after addition. In one embodiment, about 0.97 grams of 34 weight percent KOH solution is added to an LR6 type cell as free electrolyte. This free electrolyte solution comprises dissolved zinc oxide in a range of about 0.01-6.0 weight percent. In embodiments, the free electrolyte solution comprises dissolved zinc oxide in an amount of greater than, less than, or equal to about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0 weight percent, or in any range between two of these values. In a preferred embodiment, the free electrolyte solution comprises dissolved zinc oxide in an amount of between about 4.0-6.0 weight percent. The free electrolyte solution may be about 85%, 86%, 87%, 88%, 89%, 90%, 91%, 92%, 93%, 94%, 95%, 96%, 97%, 98%, 99%, or 100% saturated with dissolved zinc oxide.

In an embodiment, the free electrolyte solution comprises potassium hydroxide (KOH), sodium hydroxide (NaOH), lithium hydroxide (LiOH), magnesium hydroxide $(Mg(OH)_2)$, calcium hydroxide $(Ca(OH)_2)$, magnesium perchlorate $(Mg(ClO_4)_2)$, magnesium chloride $(MgCl_2)$, or magnesium bromide $(MgBr_2)$.

As an example, a shot of free electrolyte may be added to the cell after insertion of the anode and/or cathode into the cell. In one example, one or more shots of free electrolyte may be added to the cell after insertion of the anode, cathode, and separator into the cell interior. Once the active materials are added to the cell, the cell may be sealed with annular seal and one or more covers, and the cell can may be crimped to close the open end of the cell can to form the complete cell. In certain embodiments, a plastic film label (e.g., a heat-shrink label) may be secured to the exterior of the cell and formed over the peripheral edges of the can, to provide insulation against incidental short-circuit connection between the positive and negative terminals of the battery cell.

The foregoing descriptions of assembly methods should be taken as mere examples. The sequence of inserting the electrodes, separator, and electrolyte into the cell may be varied to best suit the compositions and shapes of those components.

While embodiments have been illustrated and described in detail above, such illustration and description are to be considered illustrative or exemplary and not restrictive. It will be understood that changes and modifications may be made by those of ordinary skill within the scope and spirit of the following claims. In particular, embodiments include any combination of features from different embodiments described above and below.

The embodiments are additionally described by way of the following illustrative non-limiting examples that provide a better understanding of the embodiments and of its many advantages. The following examples are included to demonstrate preferred embodiments. It should be appreciated by those of skill in the art that the techniques disclosed in the examples which follow represent techniques used in the embodiments to function well in the practice of the embodiments, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the embodiments.

Examples

Figure 10:
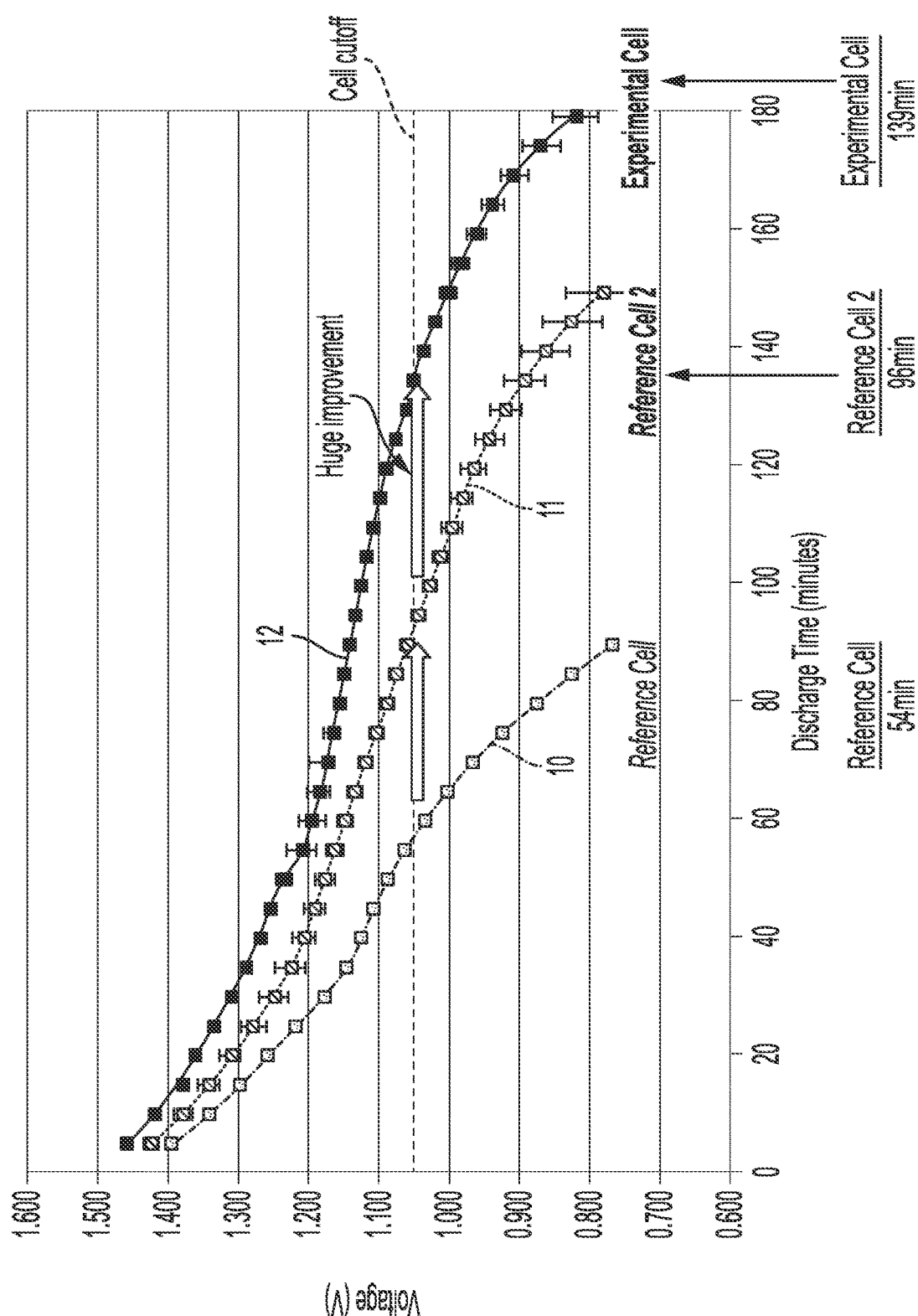
FIG. 10 shows graphical discharge charts for an experimental cell configured in accordance with FIG. 3 compared with reference cells.

The discharge performance of batteries provided in accordance with embodiments discussed herein were tested against traditional bobbin-style cells, having a centrally located anode. The results of cell real impedance measurements and Digital Still Camera (DSC) test of high discharge performance of the batteries are shown in TABLE 1, below, and select discharge data on the DSC test is illustrated in the chart of FIG. 10. The DSC test is a high power test, having testing protocols consisting of discharging a cell at alternating loads of 1500 mW for 2 seconds and 650 mW for 28 seconds for 5 minutes each hour, until the cell is determined to have a remaining potential of 1.05V representing the cell's functional end point (FEP). Cell impedance is the real part of the complex impedance of the cell measured under a 10 mV voltage amplitude at 10 kHz using a four-wire connection. The instrument used for the cell impedance measurement was a Solarton Potentiostat (model 1287) coupled with a Solartron Frequency Analyzer (model 1250).

TABLE 1

| Ref. # | Cell construction | Cell real impedance (Ohms) | DSC service (minutes) |
|---|---|---|---|
| 1 | Bobbin construction, FIG. 1-2 (comparison) | 0.041 | 54 |
| 2 | Dual cathode (comparison) | 0.038 | 96 |
| 3 | Split anode A/C = 1.13 (comparison). | 0.032 | 104 |
| 4 | Split anode A/C = 1.26 (comparison). | 0.025 | 94 |
| 5 | Dual cathode, FIG. 3 lot A | 0.024 | 139 |
| 6 | Dual cathode, FIG. 3 lot B | 0.027 | 124 |
| 7 | Dual cathode, FIG. 6 | 0.022 | 125 |
| 8 | Split anode, FIG. 8 A/C = 1.13 | 0.024 | 120 |
| 9 | Split anode, FIG. 8 A/C = 1.26 | 0.025 | 114 |

Rows 1-4 of TABLE 1 provide data indicative of comparative test results from tests of reference cells, illustrating the tested cell impedance and DSC service for comparative reference cell designs. The data of Row 1 is additionally reflected at line 10 of FIG. 10.

Rows 5-9 of TABLE 1 provide data indicative of the cell real impedance and DSC service for cells having configurations according to various embodiments.

TABLE 2 provides a description of the construction of each of the tested cells. The descriptions of the cells provided in corresponding columns of TABLE 2 may be cross-referenced with the results for the corresponding cells provided in rows of TABLE 1 by the included Ref # (indicated in the first column of TABLE 1 and the first row of TABLE 2).

TABLE 2

| | Ref. # | | | | | | | | |
|---|---|---|---|---|---|---|---|---|---|
| | 1 | 2 | 3 | 4 | 5 | 6 | 7 | 8 | 9 |
| Description | Bobbin construction | Dual cathode | Split anode A/C = 1.13 | Split anode A/C = 1.26 | Dual cathode lot A | Dual cathode lot B | Dual cathode | Split anode A/C = 1.13 | Split anode A/C = 1.26 |
| Cathode weight (g) | 11.52 | 11.77 | 11.45 | 10.99 | 11.07 | 11.07 | 11.07 | 11.45 | 10.99 |
| Cathode formulation | | | | | | | | | |
| EMD, wt % | 91.62 | 91.62 | 91.33 | 91.33 | 91.33 | 91.33 | 91.33 | 91.33 | 91.33 |
| Expanded graphite (GA17 from Superior Graphite), wt % | 3.66 | 3.66 | 3.95 | 3.95 | 3.95 | 3.95 | 3.95 | 3.95 | 3.95 |

TABLE 2-continued

|  | Ref. # | | | | | | | | |
|---|---|---|---|---|---|---|---|---|---|
|  | 1 | 2 | 3 | 4 | 5 | 6 | 7 | 8 | 9 |
| 40 wt % KOH solution, wt % | 3.03 | 3.03 | 3.04 | 3.04 | 3.04 | 3.04 | 3.04 | 3.04 | 3.04 |
| Coathylene binder, wt % | 0.10 | 0.10 | 0.10 | 0.10 | 0.10 | 0.10 | 0.10 | 0.10 | 0.10 |
| Additives, wt % | 1.59 | 1.59 | 1.59 | 1.59 | 1.59 | 1.59 | 1.59 | 1.59 | 1.59 |
| Anode weight (g) | 6.29 | 6.25 | 5.81 | 6.20 | 6.25 | 6.25 | 6.25 | 5.81 | 6.20 |
| Anode formulation | | | | | | | | | |
| Zinc alloy powder (Bi, In and Al alloying elements), wt % | 69.87 | 69.87 | 69.87 | 69.87 | 69.87 | 69.87 | 69.87 | 69.87 | 69.87 |
| 28 wt % KOH solution, wt % | 29.13 | 29.13 | 29.13 | 29.13 | 29.13 | 29.13 | 29.13 | 29.13 | 29.13 |
| ZnO, wt % | 0.29 | 0.29 | 0.29 | 0.29 | 0.29 | 0.29 | 0.29 | 0.29 | 0.29 |
| Gelling agent, wt % | 0.45 | 0.45 | 0.45 | 0.45 | 0.45 | 0.45 | 0.45 | 0.45 | 0.45 |
| Additives, wt % | 0.26 | 0.26 | 0.26 | 0.26 | 0.26 | 0.26 | 0.26 | 0.26 | 0.26 |

A first reference cell, corresponding to the data of row 1 of TABLE 1, column 1 of TABLE 2, and line 10 of FIG. 10, has a construction as illustrated in FIGS. 1-2. The outer cathode ring of the reference cell has a composition of 91.62 wt % EMD, 3.66 wt % expanded graphite, 3.03 wt % of KOH solution (concentration of the KOH is 40 wt %), and 0.10 wt % coathylene binder, and 1.59 wt % additives, and is formed by ring molding to form the outer cathode structure of the cell. A gelled anode having a composition of 69.87 wt % zinc alloy powder containing Bi, In, and Al, 29.13 wt % KOH solution (having a concentration of 28 wt %), 0.29 wt % ZnO, 0.45 wt % gelling agent, and 0.26 wt % additives is positioned within the central cavity of the cathode structure, and a two layers of separator material each having a 0.003" thickness is positioned between the cathode and the anode. As shown in FIG. 1, a central current collector pin is utilized in association with the anode, and the cell can itself is utilized as a current collector for the cathode. With reference to FIG. 10, the reference cell was determined to have a runtime of 54 minutes under testing conditions of the DSC test (the runtime being defined as the amount of time for the battery to discharge from a new, undischarged state until the voltage output of the battery decreases to less than 1.050 V) and a cell impedance of 0.041 ohms.

A second reference cell, corresponding to the data of row 2 of TABLE 1, column 2 of TABLE 2, and line 11 of FIG. 10 was also included within the test results. The second reference cell has a dual-cathode construction, characterized by an outer cathode and an inner cathode and an annular anode ring positioned between the outer cathode and the inner cathode, and the inner cathode is defined within a central cavity of the anode. The anode ring of the second reference cell has a composition of 69.87 wt % zinc alloy powder containing Bi, In, and Al, 29.13 wt % KOH solution (the concentration of KOH is 28 wt %), 0.29 wt % ZnO, 0.45 wt % gelling agent, and 0.26 wt % additives, and is formed by dispensing the flowable anode gel into the anode cavity. The outer cathode and the inner cathode comprise similar cathode compositions. The cathode has a composition of 91.62 wt % EMD, 3.66 wt % expanded graphite, 3.03 wt % of KOH solution (concentration of the KOH is 40 wt %), and 0.10 wt % coathylene binder, and 1.59 wt % additives, and the inner cathode includes an embedded mesh sheet current collector therein. The mesh sheet current collector is defined by a flat mesh sheet folded into an accordion configuration, and disposed within the central cathode to extend along the length of the center cathode. As shown at line 11 of FIG. 10, the second reference cell was determined to have a runtime of 96 minutes under the testing conditions of the DSC test and an impedance of 0.038 ohms.

A third reference cell, corresponding to the data of row 3 of TABLE 1 and column 3 of TABLE 2 was also included within the test results. The third reference cell has split anode construction, having an outer cathode surrounding two "D"-shaped anodes, each having a corresponding nail-shaped current collector therein. The two D-shaped anodes are positioned on opposite sides of an at least substantially rectangular inner cathode including an embedded mesh sheet current collector therein. The third reference cell has an A/C ratio of 1.13. The mesh sheet current collector is defined by a flat mesh sheet folded into an accordion configuration, and disposed within the central cathode to extend along the length of the center cathode. As shown in TABLE 1, above, the third reference cell was determined to have a runtime of 104 minutes under the testing conditions of the DSC test and an impedance of 0.032 ohms.

A fourth reference cell, corresponding to the data of row 4 of TABLE 1 and column 4 of TABLE 2 was also included within the test results. The fourth reference cell has a split anode construction analogous to that discussed in reference to the third reference cell, having an outer cathode surrounding two "D"-shaped anodes, each having a corresponding nail-shaped current collector therein. The two D-shaped anodes are positioned on opposite sides of an at least substantially rectangular inner cathode including an embedded mesh sheet current collector therein. The third reference cell has an A/C ratio of 1.26. The mesh sheet current collector is defined by a flat mesh sheet folded into an accordion configuration, and disposed within the central cathode to extend along the length of the center cathode. As shown in TABLE 1, above, the third reference cell was determined to have a runtime of 104 minutes under the testing conditions of the DSC test and an impedance of 0.025 ohms.

Finally, experimental cells having configurations in accordance with various embodiments discussed herein were tested. A first experimental cell (data for which is reflected in Row 5 of TABLE 1, Column 5 of TABLE 2, and line 12 of FIG. 10) and second experimental cell (data for which is reflected in Row 6 of TABLE 1 and column 6 of TABLE 2) each have a dual-cathode configuration as illustrated in FIG. 3, including an outer cathode and an inner cathode, and an annular anode positioned therebetween. The anode ring of the first experimental cell and second experimental cell each have a composition of 69.87 wt % zinc alloy powder containing Bi, In, and Al, 29.13 wt % KOH solution (the concentration of KOH is 28 wt %), 0.29 wt % ZnO, 0.45 wt % gelling agent, and 0.26 wt % additives, and is formed by dispensing the flowable anode gel into the anode cavity. The outer cathode and the inner cathode comprise similar cathode compositions. The cathode has a composition of 91.33 wt % EMD, 3.95 wt % expanded graphite, 3.04 wt % of KOH solution (concentration of the KOH is 40 wt %), and 0.1 wt % coathylene binder, and 1.59 wt % additives, and includes a cylindrical mesh current collector that is at least substantially concentric with the cathode. Within the LR6 experimental cell, the cylindrical mesh current collector has a diameter of at least approximately 2 mm, formed by wrapping a flat mesh sheet around a 2-mm diameter, round forming die. Thus, the cylindrical mesh current collector is located at least approximately at the mid-point of the radius of the central cathode. As shown at line 12 of FIG. 10, the first experimental cell was determined to have a runtime of 139 minutes under the testing conditions of the DSC test (and an impedance of 0.024 ohms) approximately a 257% increase in runtime as compared with the first reference battery. The second experimental cell was determined to have a runtime of 124 minutes under DSC testing conditions and an impedance of 0.027 ohms, as reflected at row 6 of TABLE 1.

Figure 7:
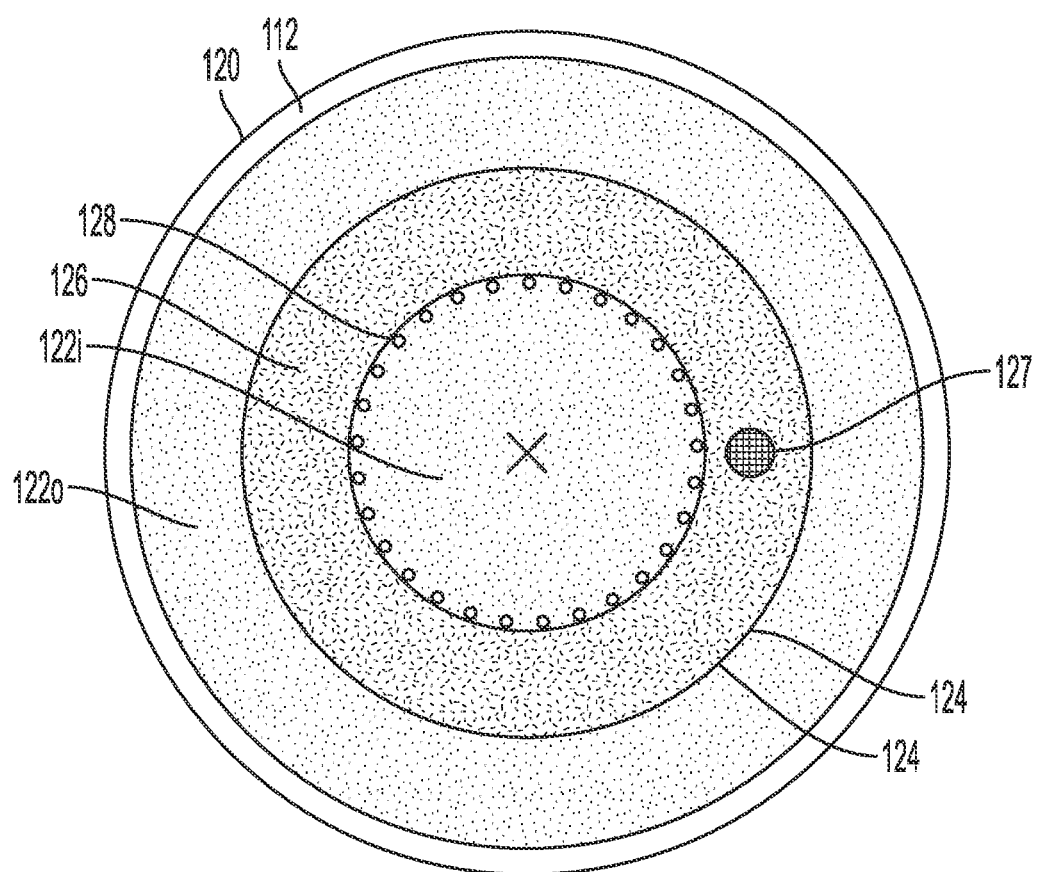
FIG. 7 is a cross-sectional view of the battery cell in FIG. 6, taken perpendicular to the longitudinal axis of the cell at IV-IV.

A third experimental cell, having a configuration as shown in FIGS. 6-7 was also tested. The third experimental cell has a dual-cathode configuration, including an outer cathode and an inner cathode, and an annular anode positioned therebetween. The anode ring of the first experimental cell and second experimental cell each have a composition of 69.87 wt % zinc alloy powder containing Bi, In, and Al, 29.13 wt % KOH solution (the concentration of KOH is 28 wt %), 0.29 wt % ZnO, 0.45 wt % gelling agent, and 0.26 wt % additives, and is formed by dispensing the flowable anode gel into the anode cavity. The outer cathode and the inner cathode comprise similar cathode compositions. The cathode has a composition of 91.33 wt % EMD, 3.95 wt % expanded graphite, 3.04 wt % of KOH solution (concentration of the KOH is 40 wt %), and 0.1 wt % coathylene binder, and 1.59 wt % additives. The inner cathode comprises 4 stacked cathode pellets, which are collectively wrapped with a cylindrical mesh current collector embedded within the exterior surface of the stacked cathode pellets. As shown in TABLE 1, the third experimental cell was determined to have a runtime of 125 minutes under the testing conditions of the DSC test and an impedance of 0.022, as reflected at row 7 of TABLE 1 (the construction of this experimental cell is reflected at column 7 of TABLE 2).

A fourth experimental cell, having a configuration as shown in FIG. 8 and having a construction reflected at column 8 of TABLE 2 was tested. The fourth experimental cell has a split anode construction, having an outer cathode surrounding two "D"-shaped anodes, each having a corresponding nail-shaped current collector therein. The two D-shaped anodes are positioned on opposite sides of an at least substantially rectangular inner cathode including an embedded mesh current collector therein. The fourth experimental cell had an A/C ratio of 1.13. As shown in FIG. 8, the mesh current collector has a rectangular cross-section having a shape corresponding with the shape of the inner cathode. The mesh current collector has side-wall lengths shorter than the sidewall lengths of the inner cathode, such that the mesh current collector is formed within the interior of the inner cathode. As shown in row 8 of TABLE 1, above, the fourth experimental cell was determined to have a runtime of 120 minutes under the testing conditions of the DSC test and an impedance of 0.024 ohms.

Finally, a fifth experimental cell, having a configuration as shown in FIG. 8 and as discussed in reference to the fourth experimental cell was tested. The fifth experimental cell had an A/C ratio of 1.26 and a construction as reflected in column 9 of TABLE 2. As shown in row 9 of TABLE 1, above, the fourth experimental cell was determined to have a runtime of 114 minutes under the testing conditions of the DSC test and an impedance of 0.025 ohms.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An alkaline electrochemical cell comprising:
   a container;
   an anode positioned within the container and defining an opening therein, wherein the anode comprises a zinc active material;
   an inner cathode positioned within the opening of the anode, wherein the inner cathode comprises a manganese oxide active material;
   wherein the inner cathode is at least substantially rectangular and has an at least substantially uniform composition across an entire width of the inner cathode; and
   a cathode current collector comprising a conducting tube positioned within the inner cathode, wherein the cathode current collector is electrically connected with a positive terminal of the electrochemical cell; and
   a separator positioned between the anode and the inner cathode.

2. The alkaline electrochemical cell of claim 1, further comprising an outer cathode positioned between an outer surface of the anode and an interior surface of the container.

3. The alkaline electrochemical cell of claim 2, wherein the cathode current collector is in electrical contact with the container via a conductive tab.

4. The alkaline electrochemical cell of claim 1, wherein the conducting tube comprises a conducting mesh material.

5. The alkaline electrochemical cell of claim 4, wherein the conducting tube comprises a nickel mesh material.

6. The alkaline electrochemical cell of claim 5, wherein the nickel mesh material has a graphite coating.

7. The alkaline electrochemical cell of claim 4, wherein the conducting tube comprises a perforated nickel foil material.

8. The alkaline electrochemical cell of claim 1, wherein the conducting tube comprises a conducting wire coil.

9. The alkaline electrochemical cell of claim 1, wherein the cathode current collector has a cross-sectional shape corresponding to the shape of the inner cathode.

10. The alkaline electrochemical cell of claim 9, wherein the cathode current collector is at least substantially rectangular and defines sidewalls that have a length that is at least substantially half of a length of sidewalls of the inner cathode.

11. The alkaline electrochemical cell of claim 1, wherein the cathode current collector is embedded within an exterior surface of the inner cathode.

12. The alkaline electrochemical cell of claim 1, wherein the inner cathode comprises a plurality of cathode pellets stacked within the opening of the anode.

13. The alkaline electrochemical cell of claim 12, wherein the cathode current collector is embedded within an exterior surface of each of the plurality of cathode pellets.

14. The alkaline electrochemical cell of claim 1, wherein the anode comprises a gelled anode.

15. An alkaline electrochemical cell comprising:
a container;
an outer cathode positioned adjacent an interior surface of the container and defining an opening therein, wherein the outer cathode comprises a cathode active material;
at least one anode portion positioned within the opening of the outer cathode, wherein the at least one anode portion comprises an anode active material;
an inner cathode positioned adjacent a side of the at least one anode portion, and wherein the inner cathode is at least substantially rectangular and has an at least substantially uniform composition across an entire width of the inner cathode;
a cathode current collector comprising a conducting tube positioned within the inner cathode, wherein the cathode current collector is electrically connected with a positive terminal of the electrochemical cell; and
a separator material:
   positioned between the outer cathode and the at least one anode portion; and
   positioned between the at least one anode portion and the inner cathode.

16. The alkaline electrochemical cell of claim 15, wherein the cathode current collector is in electrical contact with container via a conductive tab.

17. The alkaline electrochemical cell of claim 15, wherein the conducting tube comprises a conducting mesh material.

18. The alkaline electrochemical cell of claim 17, wherein the conducting tube comprises a nickel mesh material.

19. The alkaline electrochemical cell of claim 15, wherein the at least one anode portion comprises two anode portions, wherein the two anode portions are positioned on opposite sides of the inner cathode.

20. The alkaline electrochemical cell of claim 15, wherein the cathode current collector is embedded within an exterior surface of the inner cathode.

* * * * *